(12) United States Patent
Yoshida

(10) Patent No.: US 7,599,096 B2
(45) Date of Patent: Oct. 6, 2009

(54) TINT ADJUSTMENT FOR MONOCHROME IMAGE PRINTING

(75) Inventor: Seishin Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1006 days.

(21) Appl. No.: 10/652,728

(22) Filed: Aug. 28, 2003

(65) Prior Publication Data

US 2004/0227977 A1    Nov. 18, 2004

(30) Foreign Application Priority Data

Aug. 29, 2002  (JP)  ............................... 2002-251501
Jul. 23, 2003   (JP)  ............................... 2003-200257

(51) Int. Cl.
H04N 1/40   (2006.01)

(52) U.S. Cl. ...................... 358/3.01; 358/1.9; 358/3.23; 382/276; 347/6; 347/9

(58) Field of Classification Search ................. 358/276, 358/3.01, 3.23, 3.21, 1.9; 347/100, 6, 9; 345/153; 382/276

See application file for complete search history.

(56) References Cited

U.S. PATENT DOCUMENTS

| | | | | |
|---|---|---|---|---|
| 5,297,058 A | * | 3/1994 | Samworth | .................... 382/167 |
| 5,495,539 A | * | 2/1996 | Sieverding | .................... 382/276 |
| 5,896,122 A | * | 4/1999 | MacDonald et al. | ......... 345/602 |
| 6,057,932 A | * | 5/2000 | Yoshida et al. | ................ 358/1.9 |
| 7,190,487 B2 | * | 3/2007 | Dalrymple et al. | ........... 358/1.9 |
| 2003/0038870 A1 | * | 2/2003 | Shimada | ..................... 347/100 |

FOREIGN PATENT DOCUMENTS

| | | |
|---|---|---|
| JP | 11-196285 | 7/1999 |
| JP | 2002-059571 | 2/2002 |

OTHER PUBLICATIONS

Abstract of Japanese Patent Publication No. 11-196285, Pub. Date: Jul. 21, 1999, Patent Abstracts of Japan.
Abstract of Japanese Patent Publication No. 2002-059571, Pub. Date: Feb. 26, 2002, Patent Abstracts of Japan.

* cited by examiner

Primary Examiner—King Y Poon
Assistant Examiner—Jamares Washington
(74) Attorney, Agent, or Firm—Martine Penilla & Gencarella, LLP

(57) ABSTRACT

On the basis of a standard one-dimensional LUT 412, a plurality of one-dimensional LUTs 413 having mutually different tones are generated. Next, a plurality of monochrome sample images are generated using this one-dimensional LUTs 413, and a catalog print in which these monochrome sample images are arranged is printed out. Once the user has selected from the catalog print a sample image having the desired tone, a monochrome image is printed out using the one-dimensional LUT 413 that corresponds to the sample image.

4 Claims, 24 Drawing Sheets

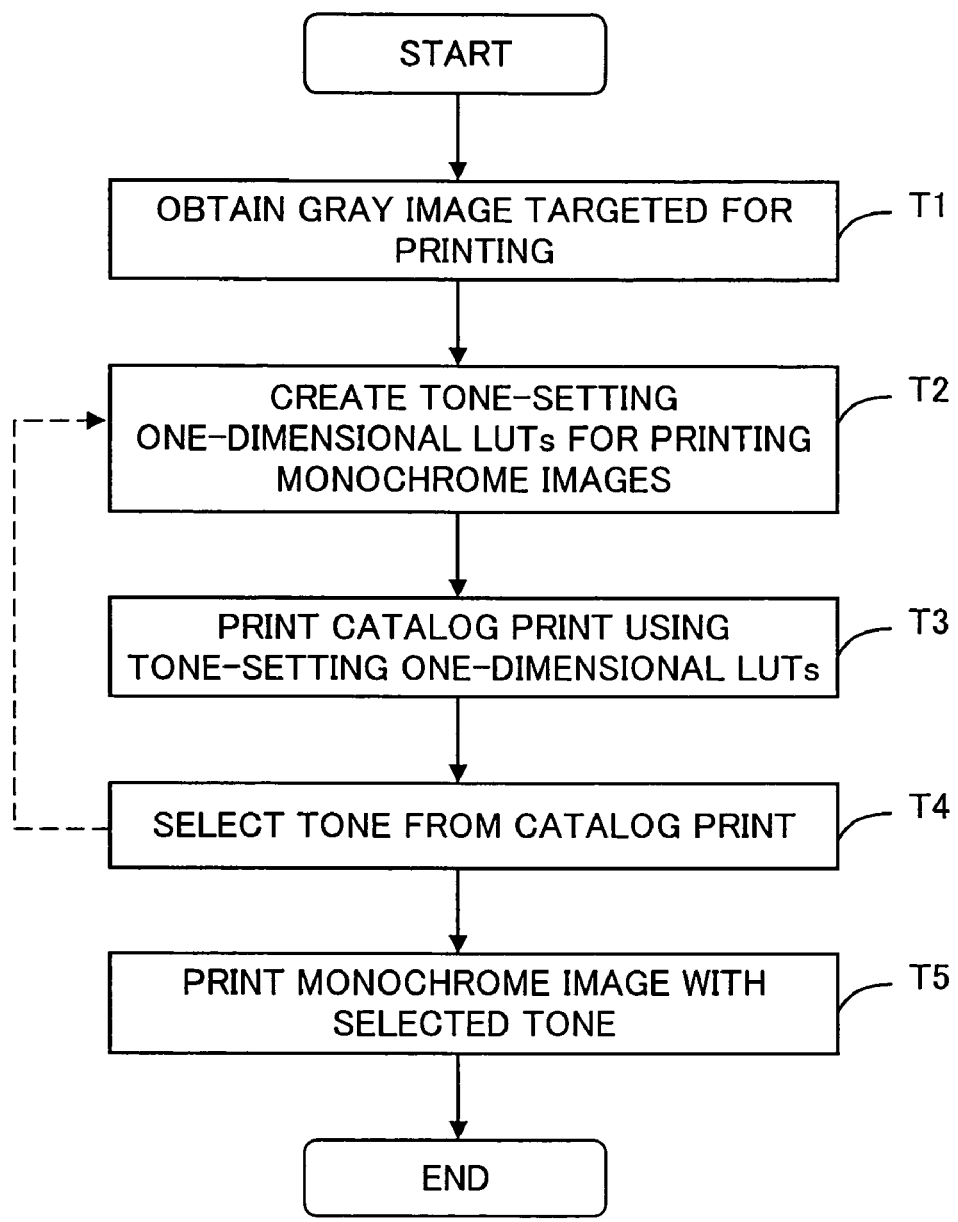

IMAGE TARGETED FOR PRINTING

STANDARD ONE-DIMENSIONAL LUT 412

TONE-SETTING ONE-DIMENSIONAL LUTs 413

$C' = C \times (Cv/Cmax)$
$M' = M \times (Mv/Mmax)$
$Y' = Y \times (Yv/Ymax)$

CATALOG PRINT

PRINT MONOCHROME IMAGE

CATALOG PRINT

TINT DISTRIBUTION

TINT ADJUSTMENT FOR MONOCHROME IMAGE PRINTING

BACKGROUND OF THE INVENTION

1. Field of the Invention

This invention relates to a technique for imparting a tint to, for example, a gray image for printing.

2. Description of the Related Art

FIG. 22 is a block diagram showing conceptually a technique for printing a color image using a color printer. Image data DT2, indicating an image scanned by a scanner 20, is output to a computer 10. Based on the image data DT2, computer 10 displayer the image on a CRT 22, and sends the image to a color printer 30 for printing. If it is desired to print the scanned image in color, image data DT2 is composed of an R signal, a G signal, and a B signal (hereinafter collectively termed "RGB signal") that indicate amounts of red, green, and blue, respectively.

An application program 40 runs on a predetermined operating system on computer 10. This operating system includes CRT driver software 17 and printer driver software 14. Image data DT1 for transfer to color printer 30 is output by application program 40, through the printer driver software 14.

Application program 40 consists, for example, of photo retouching software, and is used to perform processes such as image retouching on image data DT2. The process result DT3 obtained from application program 40 is provided to CRT driver software 17 and printer driver software 14.

When application program 40 issues a Print command, the printer driver software 14 on computer 10 converts the process result DT3 into a print signal DT1 and sends this to the color printer 30. Color printer 30 is provided with various types of ink; DT1 includes data indicating dot formation status (dot data) for multiple types of ink, and information regarding sub-scan feed distances.

Printer driver software 14 includes a resolution conversion module 41a, color conversion module 41b, color conversion table 41e, halftone module 41c, and rasterizer 41d.

Resolution conversion module 41a converts the resolution of the process result DT3 received from application program 40 to the printing resolution, to obtain conversion result DT4. Naturally, conversion result DT4 also contains information regarding color. Using the color conversion table 41e, color conversion module 41b determines, on a pixel-by-pixel basis based on conversion result DT4, the ejection amount of each type of ink that will be used by color printer 30. Halftone module 41c performs a so-called halftone process. Rasterizer 41d arranges dot data in the order in which data will be transmitted to color printer 30, and outputs the final print data in the form of print signal DT1 to color printer 30.

This technique has been described, for example, in JP2002-59571A. A technique for printing a plurality of images corresponding to a plurality of colors using a color printer has been described, for example, in JP11-196285A.

Techniques for representing color images on printing media in this way are widely used. However, monochrome images having a single tint (also termed "monotone images") can have a unique ambience when having a certain tone, and thus demand for printing monochrome images is high as well. The conventional technique illustrated in FIG. 22 can be used for printing of monochrome images as well.

For example, an image scanned by scanner 20 is recognized by computer 10 to be a colorless gray image. Since, in a gray image, each pixel has equal amounts of red, green, and blue, the R signal, G signal, and B signal of image data DT2 assume mutually equal values.

Application program 40 performs a process for imparting predetermined tint to the gray image represented by image data DT2 (hereinafter termed "tinting process") to produce process result DT3.

FIGS. 23 to 26 are graphs illustrating RGB signal conversion associated with the tinting process; the new R signal, G signal, and B signal belonging to process result DT3 obtained by the tinting process are designated respectively as the R' signal, G' signal, and B' signal (hereinafter collectively termed "R'G'B' signal"). The R signal, G signal, and B signal of image data DT2 assume mutually equal values. In the example given here, the RGB signal can assume 256 tone levels, corresponding to tone values which are integers from 0 to 255.

FIG. 23 illustrates an instance in which it is desired to print a gray image as a gray image (hereinafter termed "neutral tone"); FIG. 24 shows an instance in which it is desired to print a cool image (hereinafter termed "cool tone"); FIG. 25 shows an instance in which it is desired to print a warm image (hereinafter termed "warm tone"); and FIG. 26 shows an instance in which it is desired to print a color shade resembling a discolored color photograph (hereinafter termed "sepia tone"), respectively.

Once an R'G'B' signal obtained in this manner has been converted in resolution by resolution conversion module 41a, in color conversion module 41b, it is converted, with reference to the color conversion table 41e, into ejection amounts of the various types of ink used by color printer 30. Values of the R'G'B' signal are retained even after resolution conversion by the resolution conversion module 41a.

FIG. 27 is a graph describing a technique for setting ejection amounts C, M, Y, K for cyan, magenta, yellow, and black inks on the basis of an R'G'B' signal, using color conversion table 41e. Since the R' signal, G' signal, and B' signal are mutually independent, color conversion table 41e is represented conceptually as a three-dimensional cube. Here, 256 (=$2^8$) tone levels with tone values of 0 to 255 are shown. From the standpoint of limited memory capacity, it is undesirable for color conversion table 41e to store $2^8 \times 2^8 \times 2^8$ independent sets (approximately 16,780,000 sets) of data. Thus, data memory locations in color conversion table 41e are set up discretely as grid points, in sets of 17 tone values, for example. Here, a single set of data includes, for example, three kinds of data for ink ejection amounts C, M, Y. FIG. 27 shows as an example a location $T_0$ at which the R' signal, G' signal, and B' signal assume values of r0, g0, and b0 respectively.

However, there are typically instances in which grid points corresponding to arbitrary values r0, g0, and b0 do not exist. In such instances, it is typical to select several grid points around location $T_0$, and through interpolation using ink ejection amounts in memory for the selected grid points, set an ink amount corresponding to location $T_0$.

In the arrangement described above, the process of setting a tone of a monochrome image to desired tone is not easy. In particular, despite the fact that 256 types of RGB signal are sufficient in image data DT2 representing a gray image, as the R' signal, G' signal, and B' signal representing a monochrome image assume different values, a color conversion process similar to that used for a color image is required when printing the monochrome image. Additionally, setting a tone in a monochrome image involves trial and error, increasing the time required for the process.

SUMMARY OF THE INVENTION

It is therefore an object of the present invention to provide a technique whereby tone settings can be performed easily when printing a monochrome image.

To achieve the aforementioned object, a first method according to the invention is a method for setting a tone in order to print a monochrome image, comprising the steps of: (a) providing, by way of one-dimensional lookup tables for outputting ejection amounts of a plurality of types of ink in response to input of lightness level values of an image, a plurality of candidate one-dimensional lookup tables each having different color reproduction characteristics; (b) using the plurality of candidate one-dimensional lookup tables, generating a plurality of monochrome sample images from a given gray multilevel image data, and reproducing catalog images wherein the plurality of monochrome sample images are arranged; and (c) on the basis of at least one monochrome sample image selected from the catalog images, and the candidate one-dimensional lookup table associated with the selected monochrome sample image, obtaining a printing-use one-dimensional lookup table for use in printing the monochrome image.

According to this method, using a plurality of candidate one-dimensional lookup tables each having different color reproduction characteristics, a plurality of monochrome sample images are generated, and then catalog images wherein this plurality of monochrome sample images are arranged are generated, thereby enabling the user to easily select a sample image having the desired tone. Additionally, since a printing-use one-dimensional lookup table for use in printing the monochrome image is obtained on the basis of at least one monochrome sample image selected from the catalog images and the candidate one-dimensional lookup table associated with the selected monochrome sample image, it is possible to print a monochrome image having preferred tone, using this printing-use one-dimensional lookup table.

A second method according to the invention comprises the steps of (a) obtaining a gray image; and (b) printing together a plurality of monochrome images obtained by imparting a plurality of different tints to the gray image.

According to this method, monochrome images based on a given gray image but imparted with different tints are printed together, facilitating visual confirmation, thereby assisting the process of setting the desired tone.

A third method according to the invention comprises the steps of (a) obtaining a gray image; and (b) printing together a plurality of monochrome images imparted with a predetermined tint and having different gradation characteristics.

According to this method, monochrome images based on a given gray image but imparted with different gradation characteristics are printed together, facilitating visual confirmation, thereby assisting the process of setting the desired gradation characteristics.

The present invention may be realized in various modes, such as a tone setting method and device; a tone setting assisting method and device; a printing method and device; a computer program for realizing aforementioned devices or methods; or a recording medium having recorded thereon such a computer program.

These and other objects, features, aspects and advantages of the invention will be apparent from the following description of preferred embodiments made with reference to the accompanying drawings.

BRIEF DESCRIPTION OF THE DRAWINGS

FIG. 2 is a flowchart showing the overall process for performing printing of a monochrome image in the first embodiment.

DESCRIPTION OF THE PREFERRED EMBODIMENTS

The embodiments of the invention are described hereinbelow in the following order.

A. Embodiment 1

B. Embodiment 2

C. Embodiment 3

D. Embodiment 4

E. Embodiment 5

F. Embodiment 6

G. Variant Examples

A. Embodiment 1

In this embodiment of the invention, monochrome images of a given gray image imparted with a plurality of hues or tints are printed together (hereinafter, the printed material will be termed "catalog print" or "catalog image"). Viewing a catalog print, the operator selects a desired tone, and reprints a monochrome image of the gray image having the selected tone applied thereto.

Figure 1:
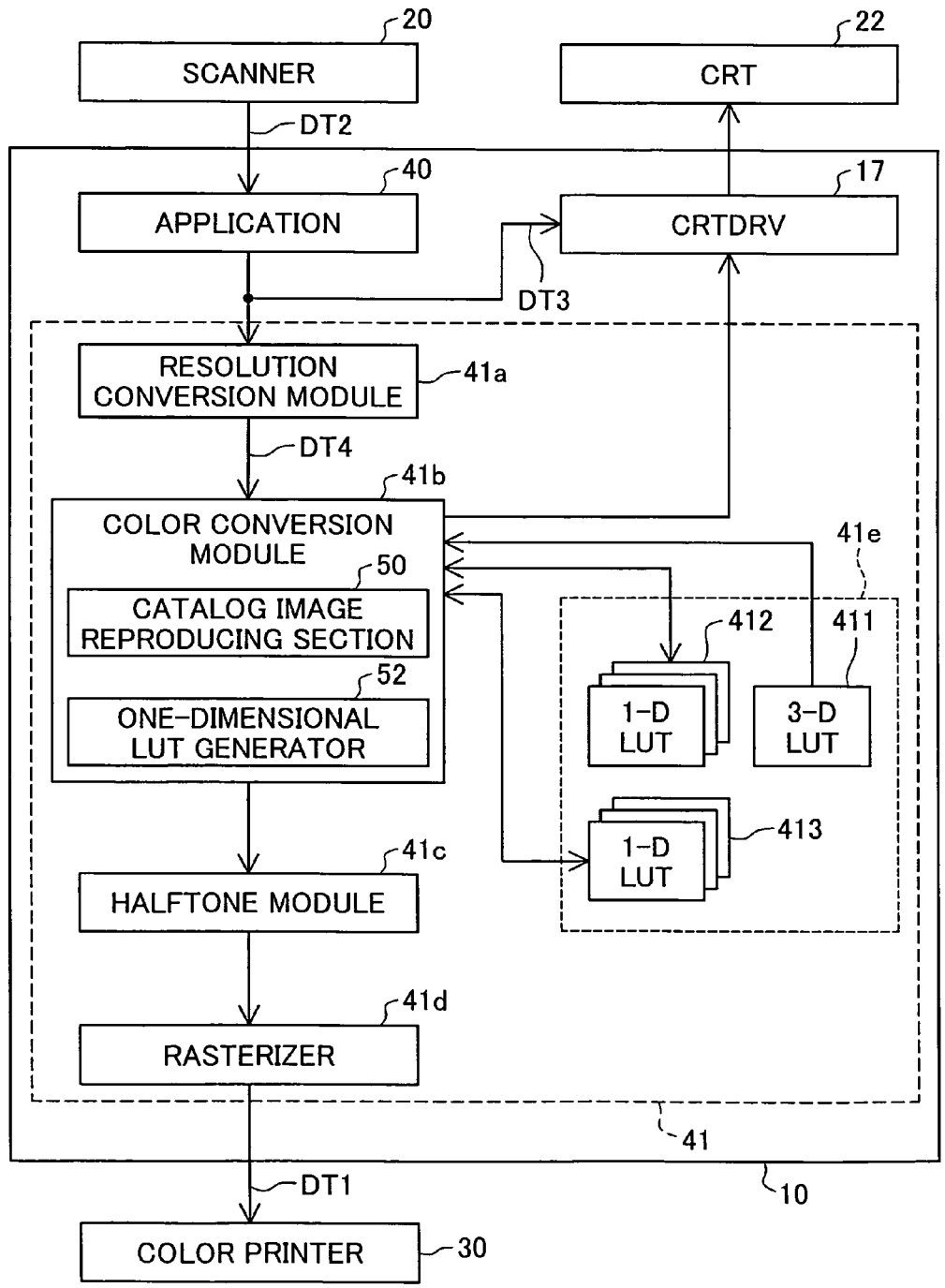
FIG. 1 is a block diagram showing conceptually a first embodiment of the invention.
Figure 22:
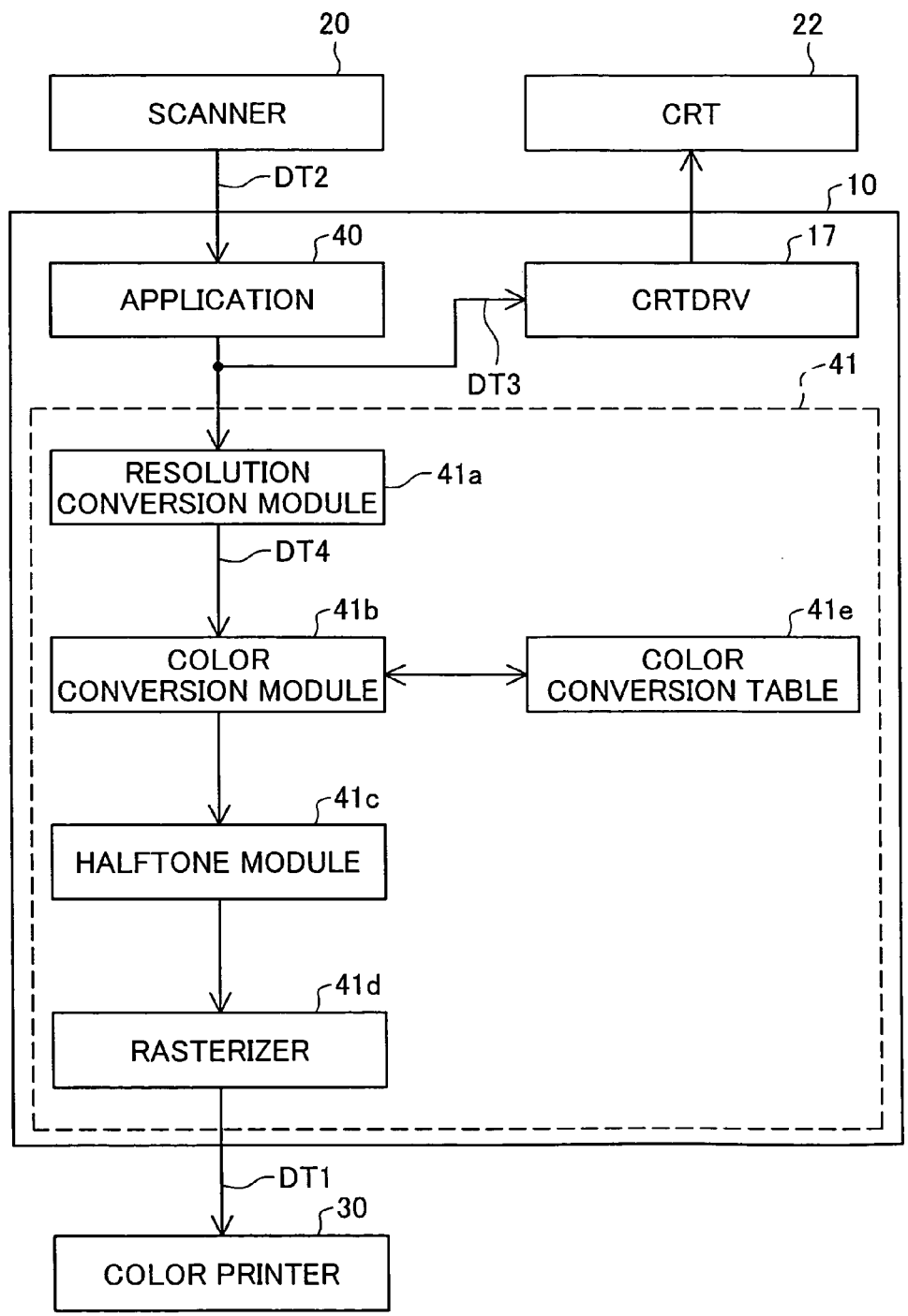
FIG. 22 is a block diagram conceptually illustrating a conventional technique.
Figure 23:
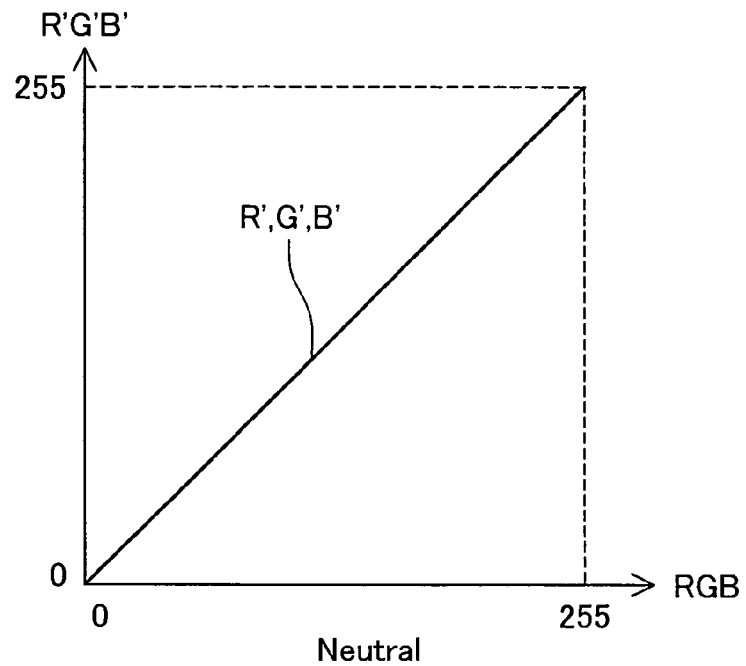
FIG. 23 is a graph illustrating RGB signal conversion associated with the tinting process.
Figure 24:
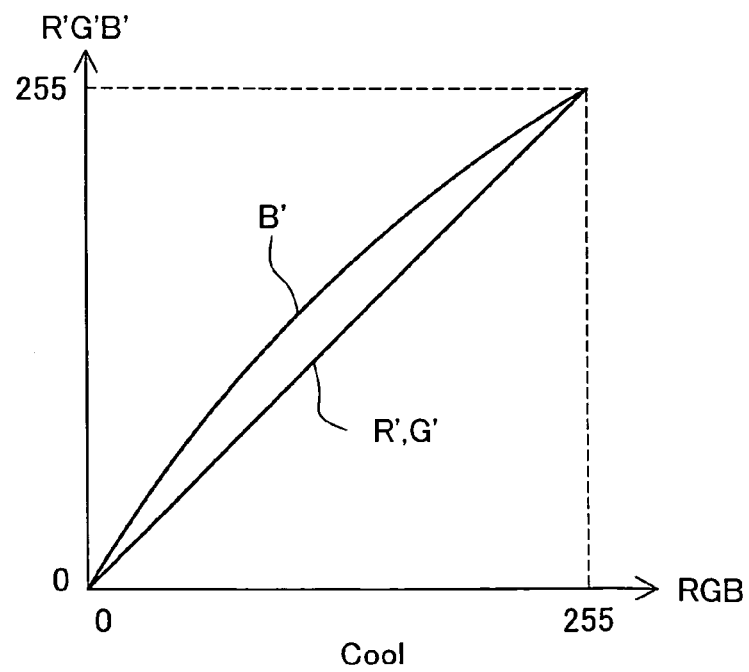
FIG. 24 is a graph illustrating RGB signal conversion associated with the tinting process.
Figure 25:
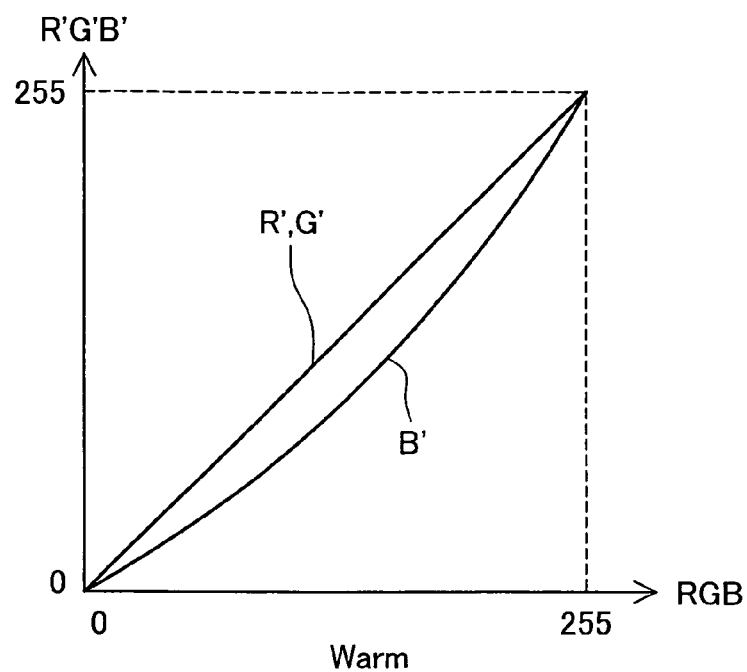
FIG. 25 is a graph illustrating RGB signal conversion associated with the tinting process.
Figure 26:
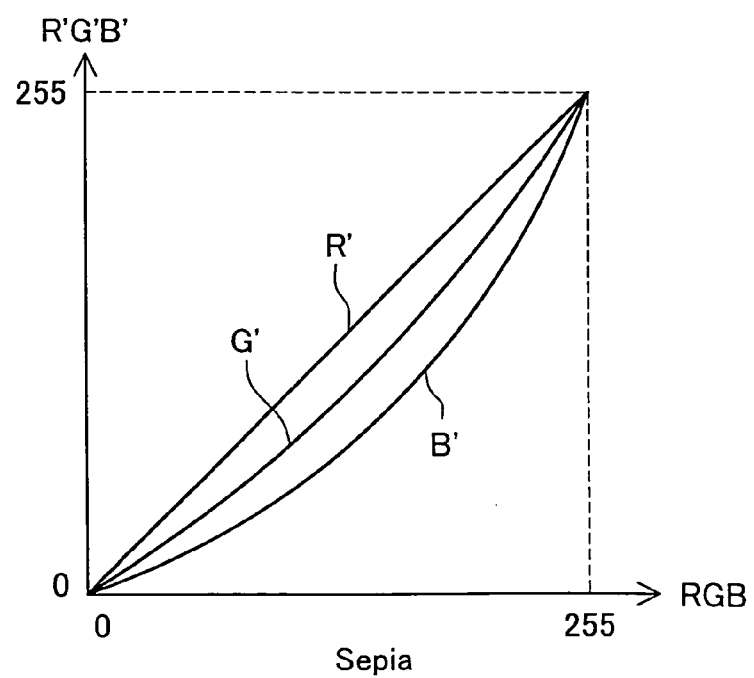
FIG. 26 is a graph illustrating RGB signal conversion associated with the tinting process.
Figure 27:
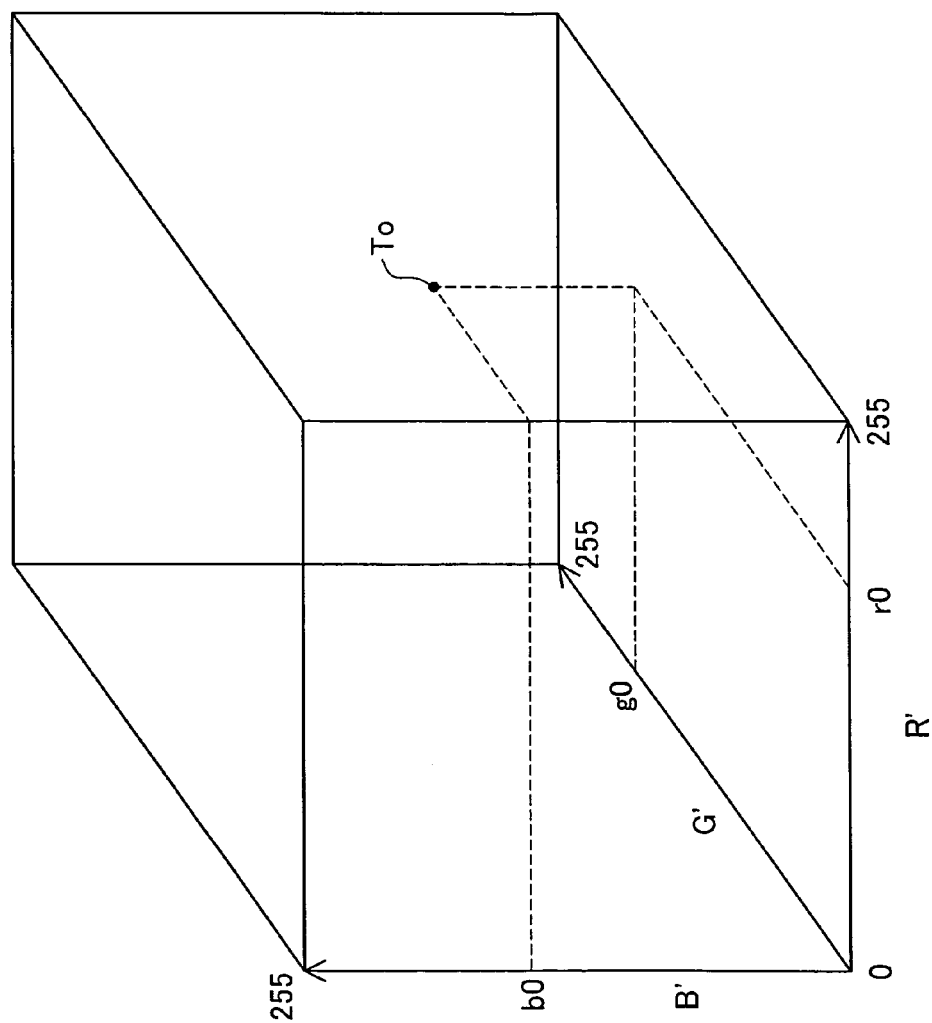
FIG. 27 is a graph describing a technique for setting ink ejection amount using a color conversion table.

FIG. 1 is a block diagram showing conceptually a technique, pertaining to a first embodiment of the invention, for printing a monochrome image using a color printer. As compared to the arrangement shown in FIG. 22, the arrangement of color conversion table 41e and the function of color conversion module 41b are characteristically different. Color conversion module 41b has a catalog image reproducing section 50 for printing or displaying catalog images, and a one-dimensional lookup table generator 52 for generating a one-dimensional lookup table for use in printing monochrome images. The functions of color conversion module 41b are described later in detail.

Where a gray image to which a plurality of tints will be applied in color conversion module 41b is obtained by scanner 20, the image may be used as-is; alternatively, a color image scanned by scanner 20 may be converted to a gray image through photo retouching by application program 40. Even where the original image is a color image, it is then converted to a gray image, making it possible to obtain a monochrome image having tint applied thereto subsequently.

Color conversion table 41e comprises a three-dimensional lookup table (LUT) 411 for color image printing, and one-dimensional lookup tables 412, 413 for monochrome image printing.

FIG. 2 is a flowchart showing the overall process for performing printing of a monochrome image in the first embodiment. FIGS. 3(A)-3(E) illustrate the overall process flow of the first embodiment. In Step T1 in FIG. 2, gray data (FIG. 3(A)) targeted for printing by application program 40 is generated. This process could be executed by a gray image generator, not shown, within printer driver 41, rather than by application program 40. In Steps T2-T4, the one-dimensional LUT generator 52 of color conversion module 41b generates a plurality of tone-setting one-dimensional lookup tables 413 (FIG. 3(C)) from the standard one-dimensional lookup table 412 (FIG. 31(B)).

Figure 4:
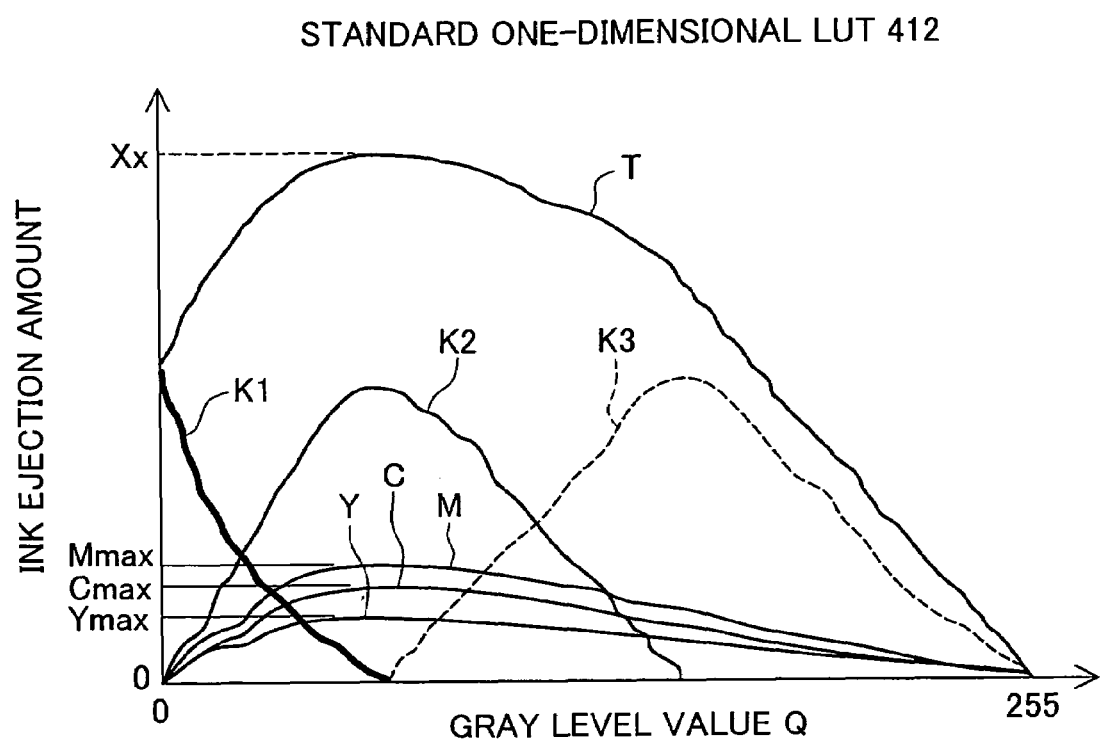
FIG. 4 schematically illustrates ink ejection amounts in a standard one-dimensional LUT 412.

FIG. 4 is a graph showing the contents of the standard one-dimensional LUT 412 enlarged. The standard one-dimensional LUT 412 in Embodiment 1 is used when printing a neutral tone gray image. Gray image lightness level value (hereinafter termed "gray level value" or "lightness level value") Q is plotted on the horizontal axis, and ejection amounts for the inks are plotted on the vertical axis. A higher gray level value Q means higher lightness. The standard one-dimensional LUT 412 used here may store a relationship between gray level value Q and ejection amount of at least one achromatic ink, or a relationship between gray level value Q and ejection amount of at least one chromatic ink.

Here, three kinds of ink with different lightness as employed as achromatic inks; ejection amounts thereof are denoted, in order from the ink having the lowest lightness, as K1, K2, and K3. As chromatic inks, the three colors cyan, magenta, and yellow are employed, ejection amounts thereof being designated C, M, Y. An image of neutral tone can be printed by employing the ink ejection amounts K1, K2, K3, C, M, Y stored in standard one-dimensional LUT 412, with reference to gray level value Q. The designation "one-dimensional LUT" means that input is one-dimensional (i.e. gray level value only). The output of the one-dimensional LUT is a plurality of values indicating ejection amounts for a plurality of inks used for monochrome printing.

From the standard one-dimensional LUT 412, one-dimensional LUT generator 52 (FIG. 1) generates a plurality of tone-setting one-dimensional LUTs 413 having mutually different tints. "Tint" herein refers to a combination of "hue" and "saturation". The tone-setting one-dimensional LUTs 413 can be thought of as having mutually different color reproduction characteristics. In each LUT of the tone-setting one-dimensional LUTs 413 shown in FIG. 3(C), achromatic ink ejection amounts K1, K2, K3 are the same as in the standard one-dimensional LUT 412, whereas the ejection amount of at least one of the chromatic inks C', M', Y' is different from that in standard one-dimensional LUT 412. In other words, tone-setting one-dimensional LUTs 413 are generated by adjusting ejection amounts of the chromatic inks C, M, Y in standard one-dimensional LUT 412. Setting of adjusting values Cv, Mv, Yv used for these adjustments (termed also "variation quantity") is described hereinbelow.

In actual practice, rather then creating tone-setting one-dimensional LUTs 413 at the time of setting the tone of a monochrome image, tone-setting one-dimensional LUTs 413 can be created in advance, and stored in memory (for example, on the hard disk).

Figure 3A:
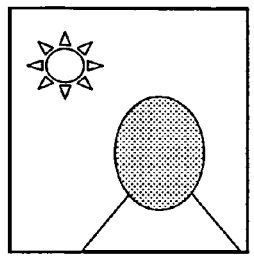
FIGS. 3(A)-3(E) illustrate the overall process flow of the first embodiment.
Figure 3B:
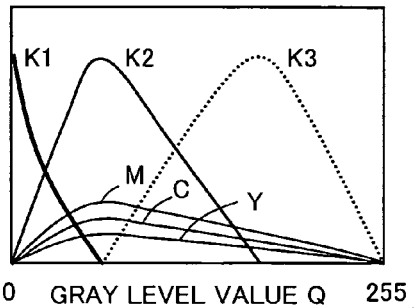
Figure 3C:
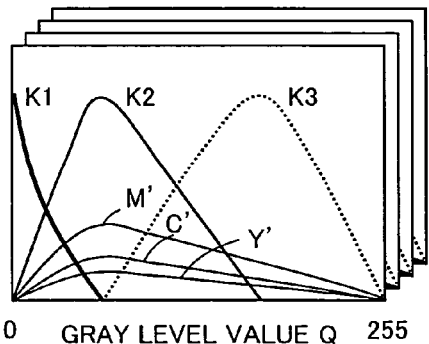
Figure 3D:
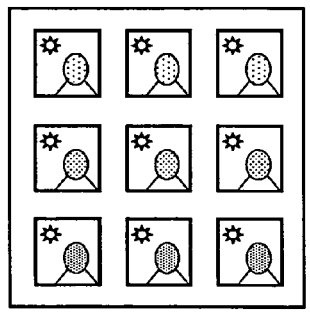
Figure 3E:
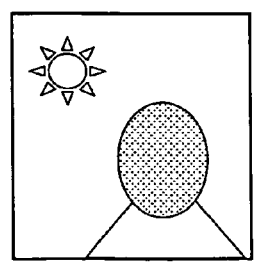

In Step T3 in FIG. 2, catalog image generator 50 (FIG. 1) uses the standard one-dimensional LUT 412 and tone-setting one-dimensional LUTs 413 to print a catalog print (FIG. 3(D)) on printer 30. This catalog print includes a plurality of monochrome sample images arranged on a printing medium. In this example, the monochrome sample images are reduced versions of images targeted for printing, each single monochrome sample image being reproduced using a single one-dimensional LUT. Accordingly, where, for example, one standard one-dimensional LUT 412 and eight tone-setting one-dimensional LUTs 413 are used, nine monochrome sample images will be generated. The one-dimensional LUTs 412, 413 used to generate monochrome sample images are also termed "candidate one-dimensional LUTs". Alternatively, monochrome sample images may be generated using a plurality of tone-setting one-dimensional LUTs 413 only, without using a standard one-dimensional LUT. In this latter case, only the tone-setting one-dimensional LUTs 413 will be candidate one-dimensional LUTs.

In preferred practice, a catalog print will include monochrome sample images arranged on a single sheet of a printing medium; however, if monochrome sample images are numerous, they may be arranged on several sheets of a printing medium. Predetermined standard images, rather than reduced versions of images targeted for printing, may be used as monochrome sample images.

In Step T4 in FIG. 2, the operator (user) selects a monochrome sample image having a desired tone from the catalog print, and inputs the selection to the computer 10 using the keyboard or mouse. In Step T5, a monochrome image is printed with the selected tone. At this time, the color conversion module 41b uses the one-dimensional LUT that was employed to reproduce the selected tone, to convert the image data of the gray image targeted for printing into ejection amounts for several types of ink. Print data DT1 to be supplied to printer 30 is then generated by halftone module 41c and rasterizer 41d. In the event that a single catalog print does not contain a satisfactory tone, the routine returns from Step T4 to Step T2, and generates new tone-setting one-dimensional LUTs 413. Subsequently, Steps T2-T4 are repeated until a tone suitable for printing a monochrome image (i.e., a monochrome sample image) is selected.

Figure 5:
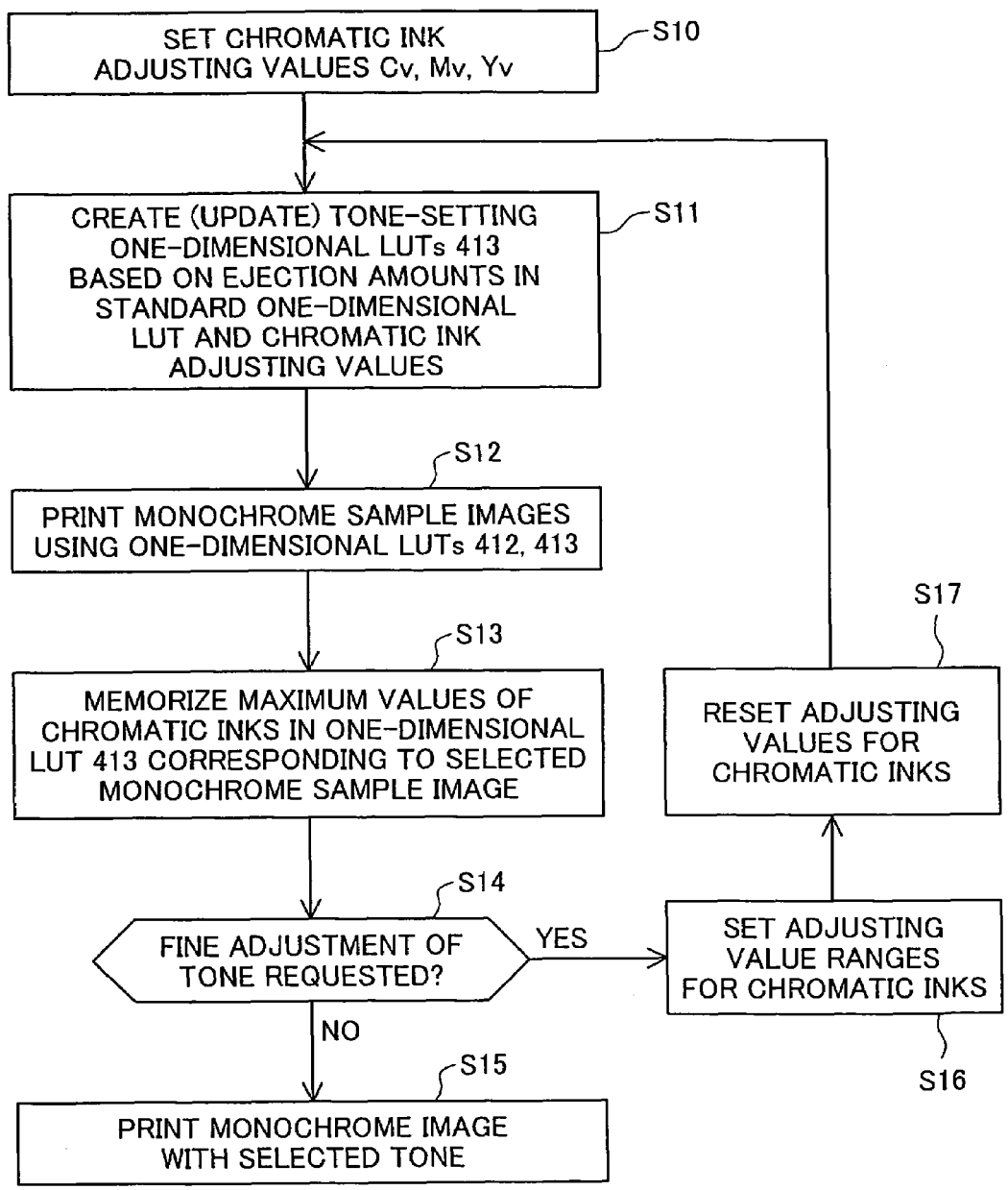
FIG. 5 is a flowchart showing operations in a first embodiment of the invention.

FIG. 5 is a flowchart showing characteristic color conversion process of color conversion module 41b; the specifics of Steps T2-T5 in FIG. 2 are shown. Steps S10-S11 in FIG. 5 correspond to Step T2 in FIG. 2, Step S12 to Step T3, Steps S13-S17 to Step T4, and Step 15 to Step T5, respectively. In Step S10, chromatic ink adjusting values (also called "variation amounts") Cv, Mv, Yv are set. Here, "ink adjusting value" corresponds to the maximum value of ink ejection amount in tone-setting one-dimensional LUT 413. In the standard one-dimensional LUT shown in FIG. 4, maximum values for ejection amounts of the three chromatic inks are denoted Cmax, Mmax, and Ymax. For example, where the cyan ink adjusting value has been set to Cv, the ejection amount C of cyan ink corresponding to each gray level value Q is multiplied by a factor of (Cv/Cmax), with the maximum value being Cv (the actual process is executed in Step S11, described hereinbelow).

Adjusting values Cv, Mv, Yv for the chromatic inks may each be set to a plurality of values. During this process, initially, predetermined ranges of ink adjusting values Cv, Mv, Yv (hereinafter termed "adjusting value ranges" or "variation bands") are set. For example, adjusting value ranges for cyan, magenta, and yellow are set respectively to $0\text{-}C_M$, $0\text{-}M_M$, and $0\text{-}Y_M$. More specifically, adjusting value ranges for chromatic inks are set to 0-20% (i.e. 10%±10%), for example. Here, "100%" corresponds to the ink ejection amount used in solid printing of one type of ink. Within these adjusting value ranges, adjusting values Cv, Mv, Yv for the inks are set to a plurality of values with predetermined intervals $\Delta c$, $\Delta m$, $\Delta y$ (hereinafter termed "interval steps" or simply "intervals"). For example, the cyan ink adjusting value Cv is set to (N+1) values, namely, 0, $\Delta c$, $2\Delta c$, ... $N\Delta c$. Here, $N\Delta c$ is equivalent to the maximum value in the adjusting value range. The arrangement is the same for the other inks. The same common values may be used as adjusting values Cv, Mv, Yv for the three chromatic inks. Specifically, six values set from 0-20% at 4% intervals may be used as adjusting values Cv, Mv, Yv. In Step S11, described later, these ink adjusting values Cv, Mv, Yv are used to create the tone-setting one-dimensional LUTs 413.

Adjusting values Cv, Mv, Yv for the chromatic inks may be set within limits of ink ejection amount for particular printing media. Printing media include paper and fabric for example; typically, if a large amount of ink (regardless of whether it is chromatic or achromatic) is deposited in a concentrated manner, color reproduction is adversely affected, or bleeding occurs, tending to result in degraded picture quality. Accordingly, in Step S10, adjusting values Cv, Mv, Yv for the chromatic inks will be set under conditions such that the total of chromatic ink ejection amount and achromatic ink ejection amount does not exceed a predetermined limit value. By so doing, degradation of picture quality owing to concentrated deposition of a large amount of ink can be avoided.

In conformance with FIG. 4, total ejection amount T represents the total of the ejection amounts K1, K2, K3 of the three types of black ink having different lightness plus the ejection amounts C, M, Y of the three chromatic inks. For example, where gray level value Q is 0, ejection amounts C, M, Y of the three chromatic inks and ejection amounts K1, K2, K3 of the black inks are each 0, so the total ejection amount T will equal the value of the ejection amount K1 of the black ink with the lowest lightness. In proximity to the gray level value Q at which ink ejection amount K2 reaches its peak, total ejection amount T assumes its maximum value of Xx.

When creating tone-setting one-dimensional LUTs 413 from a standard one-dimensional LUT 412, ejection amounts K1, K2, K3 of the achromatic inks are kept without modification. In this case, only ejection amounts of the chromatic inks differ depending on tone. The maximum value of Xx of total ejection amount T also depends on tone. Accordingly, in order to avoid excessive degradation of picture quality in catalog prints, variation ranges for chromatic ink ejection amounts are subject to limitation of ink ejection amount according to printing media.

For example, let it be assumed that adjusting value ranges for cyan, magenta, and yellow are set respectively to $0\text{-}C_M$, $0\text{-}M_M$, and $0\text{-}Y_M$. Provided that the maximum value of total ejection amount $(K1+K2+K3+C_M+M_M+Y_M)$ is below the limit of ink ejection amount for the particular printing medium, adjusting values Cv, Mv, Yv for cyan, magenta, and yellow may be set independently from one another.

As regards the limit as to ink ejection amount for a printing medium, a single, or several limits, may be set, in addition to setting the maximum value of total ejection amount T to within limit value Xx. For example, limits for individual maximum values of black ink ejection amounts K1, K2, K3, or limits for the sum of any two values among black ink ejection amounts K1, K2, K3, may be used as well.

Since limits of ink ejection amount are set individually on a printing medium-by-printing medium basis, standard one-dimensional lookup tables 412 are preferably stored on a printing medium-by-printing medium basis. For the sake of simplicity, the following description assumes a limit of ink ejection amount for a single given printing medium.

In Step S11 in FIG. 5, one-dimensional LUT generator 52 (FIG. 1) creates a plurality of tone-setting one-dimensional LUTs 413 corresponding to a plurality of tones. At this time, in order to obtain multiple monochrome images tinted with multiple different tints from a single given gray image, some or all of the ejection amounts C, M, Y of chromatic inks in the standard one-dimensional LUT 412 are changed, in order to generate a plurality of tone-setting one-dimensional LUTs 413.

A specific example of changing cyan ink ejection amount is now described. First, the ejection amount C of cyan ink needed to print a gray image is read out from standard one-dimensional LUT 412, and the maximum value Cmax thereof is obtained. Where the cyan ink adjusting value Cv ($0 \leq Cv \leq C_M$) is given, the new cyan ink ejection amount is calculated as: (Cv/Cmax)·C. That is, the cyan ink adjusting value Cv is the maximum value of the new cyan ink ejection amount. Coefficient (Cv/Cmax) is a value obtained by dividing the cyan ink adjusting value Cv by the maximum value Cmax for cyan ink ejection amount C in standard one-dimensional LUT 412. In this way, adjusting value Cv is set to a plurality of values within a predetermined range 0-$C_M$, at predetermined intervals $\Delta c$.

In similar fashion, new ink ejection amounts for the other chromatic inks are calculated depending on ink adjusting values Mv and Yv, and tone-setting one-dimensional LUTs 413 are created. In preferred practice, tone-setting one-dimensional LUTs 413 are created for all possible combinations of chromatic ink adjusting values Cv, Mv, Yv. For example, where chromatic ink adjusting values Cv, Mv, Yv are each set to (N+1) values, tone-setting LUTs 413 equal in number to $(N+1)^3$ will preferably be created. These tone-setting LUTs 413 are used to reproduce monochrome images each having different tones.

The tone-setting one-dimensional LUTs 413 constitute a group of tables associating gray level values Q with ejection amounts of achromatic and chromatic inks to reproduce mutually different tones. In other words, each tone-setting one-dimensional LUT 413 determines ejection amounts of achromatic inks according to a single variable, termed gray level value Q, which represent lightness; and determines ejection amounts of chromatic inks on the basis of gray level value Q which represent lightness, and a tone to be imparted to a gray image in order to produce a monochrome image. Accordingly, where achromatic and chromatic ink ejection amounts are determined on the basis of lightness of a gray image, calculations can be facilitated and a more rapid process achieved through the use of such one-dimensional LUTs 413.

In Step S12, a plurality of monochrome sample images are printed using a standard one-dimensional LUT 412 and tone-setting one-dimensional LUTs 413 obtained for a plurality of tones in the preceding manner. More specifically, color conversion module 41*b* (FIG. 1) converts gray image data for the image targeted for printing into ink ejection amounts using the one-dimensional LUTs, and the halftone module 41*c* and rasterizer 41*d* execute their respective processes, to generate print data DT1 tinted with the respective tints. On the basis of this print data DT1, color printer 30 prints a catalog print (FIG. 3(D)) in which a plurality of monochrome sample images are arranged.

Figure 6:
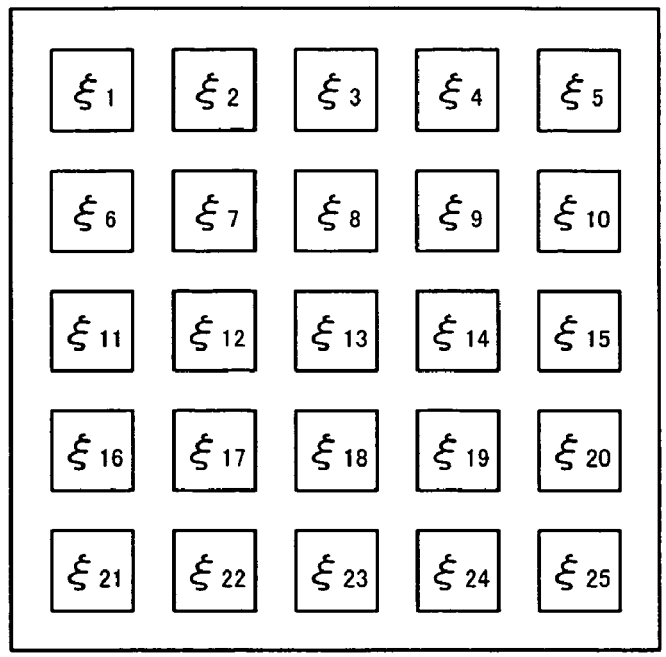
FIG. 6 illustrates an initial catalog print.

FIG. 6 schematically illustrates a catalog print arrangement in which a plurality of monochrome sample images are printed together. In this example, 25 monochrome sample images $\xi_p$ (p=1, 2, . . . 25) are printed together. For convenience in illustration, pictures have been omitted from the sample images; only symbols indicating the locations of the sample images are shown.

From the plurality of monochrome sample images printed out as a catalog print, the operator selects the desired tone. For example, where the 22nd monochrome sample image $\xi_{22}$ has the desired tone, a process to identify this monochrome sample image $\xi_{22}$ to the computer 10 is performed. In preferred practice, to facilitate identification, identification numbers for distinguishing monochrome sample images from one another will be printed on each printed monochrome sample image (for example, at location adjacent to the image). By operator input of the identification number corresponding to the selected image to the computer, the operator can identify the selected monochrome sample image $\xi_{22}$ to the computer 10.

Alternatively, a catalog screen having the same arrangement as the catalog print shown in FIG. 6 can be displayed on CRT 22, so that the desired monochrome sample image can be selected on screen (for example, by positioning a pointer shown on the screen over the selected image). In this way, a monochrome sample image to be obtained by printing can be identified on the CRT 22. In order to produce such a display on CRT 22, it will be necessary to calculate RGB signals based on ink ejection amounts; this technique will be described in detail hereinbelow.

As described above, in Step S12, image data representing monochrome sample images having different tones imparted thereto is generated on the basis of a given gray image, and a catalog print is printed on the basis of this data; this facilitates visual inspection of sample images. Accordingly, it becomes possible to assist the process of setting desired tone, Proceeding subsequently to Step S13, maximum values for chromatic ink ejection amounts (hereinafter termed "chromatic ink maximum values") Cv, Mv, Yv in the one-dimensional LUT 413 that corresponds to the selected monochrome sample image are stored in memory. These maximum values Cv, Mv, Yv are the chromatic ink adjusting values set when creating the one-dimensional LUT which was used to create the selected monochrome sample image. Step S13 is a preparatory step for Steps S16 and S17, which may possibly be executed subsequently. Accordingly, where the overall process order is designed so that the process through Steps S16 and S17 is not performed repeatedly, Step S13 will not be required.

Proceeding now to Step S14, a determination is made as to whether further fine tuning of tone is required. To use the example illustrated in FIG. 6, where the operator is satisfied that selected monochrome sample image $\xi_{22}$ has the desired tone, the operator inputs to computer 10 a message to the effect that no further fine tuning of tone is required. In this case, the process proceeds to Step S15, wherein printing is performed using the one-dimensional LUT 413 that corresponds to the selected monochrome sample image $\xi$22. By this process, a monochrome image having the desired tone is printed.

However, in the event that the operator is not satisfied that selected monochrome sample image $\xi$22 has the desired tone, the operator inputs to computer 10 a message to the effect that further fine tuning of tone is required. In this case, the process proceeds to Step S156 wherein preparations are made to print the selected monochrome sample image $\xi_{22}$, along with a plurality of monochrome sample images having a plurality of tones close thereto.

In Step S16, ranges over which chromatic ink adjusting values Cv, Mv, Yv vary and adjusting value intervals are reset. Here, in order to print a plurality of monochrome sample images whose differences in tone are finer than those of the plurality of monochrome sample images in Step S12, adjusting value range is set so as to be smaller than the previous adjusting value range set in Step S10. Likewise, the interval between adjusting values is set to a smaller value than previously. Specifically, where, for example, a maximum value Xc of 8% for cyan ejection amount has been stored in memory in Step S14, a new adjusting value range, centered on 8%, is set to 8%±3% (i.e. 5-11%), which is smaller than the previous adjusting value range of 10%±10%. The interval between adjusting values may be set to 1.5%, which is smaller than the previous interval of 4%.

Proceeding next to Step S17, chromatic ink adjusting values Cv, Mv, Yv are reset based on chromatic ink maximum values stored in memory in Step S14, and the adjusting value range set in Step S16. Specifically, a plurality of adjusting values Cv, Mv, Yv for the chromatic inks are set close to the chromatic ink maximum values stored in memory in Step S14, and within the adjusting value ranges set in Step S16.

To give a specific example, where Xc is maximum value for cyan ejection amount stored in memory in Step S14, the adjusting value range set in Step S16 is 0.04Xc (i.e.

Xc±0.02Xc), and the interval is 0.01Xc, the cyan adjusting value Cv is set to the five values 0.98Xc, 0.99Xc, Xc, 1.01Xc, and 1.02Xc. The process is similar for the other chromatic inks. In another specific example, where the adjusting value range is set to 8%±3%, and the interval to 1.5%, adjusting values Cv, Mv, Yv are each set to five values of 5%, 6.5%, 8%, 9.5%, and 11%.

Returning next to Step S11, the tone-setting one-dimensional LUTs 413 are updated. At this time, chromatic ink ejection amounts C, M, Y stored in the standard one-dimensional LUT 412 are respectively multiplied by proportional constants Cv/Cmax, Mv/Mmax, Yv/Ymax, so that newly set maximum values for chromatic ink ejection amounts equal chromatic ink adjusting values Cv, Mv, Yv set in Step S17. For example, where the cyan adjusting value Cv is 0.98 Xc, the cyan ink ejection amount of the new tone-setting one-dimensional LUT is (0.98 Xc/Cmax) C.

Figure 7:
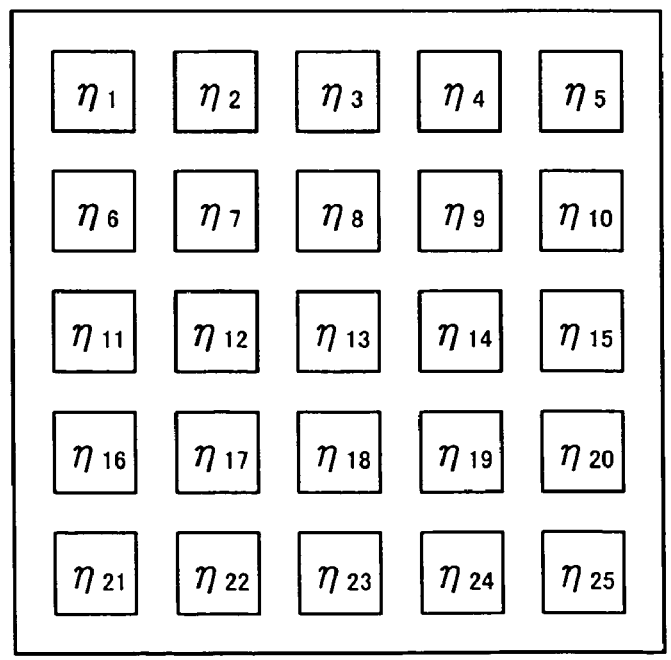
FIG. 7 illustrates a second catalog print.

Subsequently, the processes of Steps S12-S14 described earlier are repeated. FIG. 7 shows an example of a plurality of monochrome sample images printed as a catalog print, where Step S12 has been performed a second time. Here, an example of 25 monochrome sample images $\eta_p$ printed together is shown. Let is be assumed, for example, that the center monochrome sample image $\eta_{13}$ is the same as monochrome sample image $\xi_{22}$ selected the first time that Step S12 was performed.

By repeatedly executing a step of printing together a plurality of monochrome sample images of a plurality of different tones imparted to a gray image in this way, while making the ranges and intervals of the chromatic ink usage adjusting values Cv, Mv, Yv smaller in the iteration N (where N is an integer equal to 2 or greater) than in iteration (N−1), finer settings of tone can be made.

As Step S13 is a preparatory step for Step S17, the process may proceed from Step S12 to Step S14, and Step S13 may be performed prior to Step S16 when it is decided in Step S14 that another fine adjustment of tone is required.

In FIGS. 6 and 7, no particular stipulation is made regarding locations for printing the plurality of monochrome sample images; however, selection of the desired tone by the operation is easier where these locations are associated with chromatic ink ejection amounts.

Figure 8:
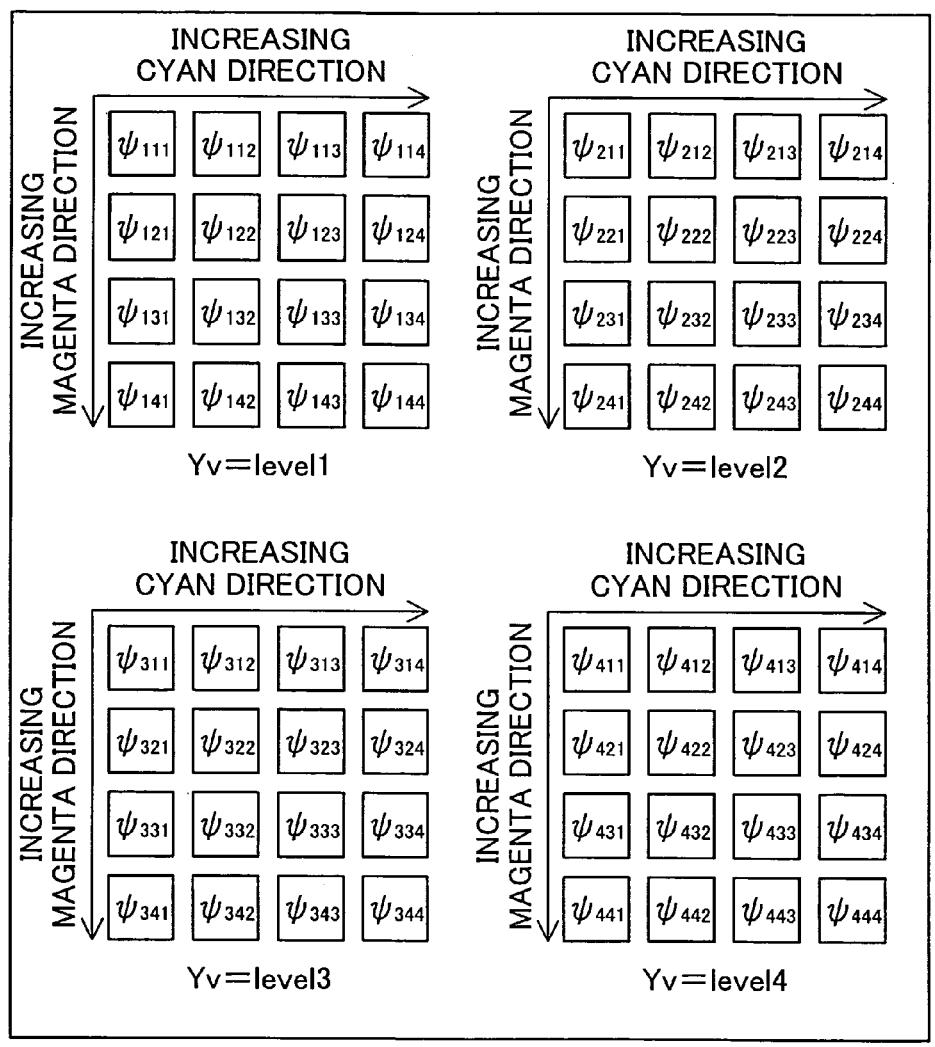
FIG. 8 illustrates another arrangement of monochrome sample images in a catalog print.

FIG. 8 illustrates another arrangement of a plurality of monochrome sample images printed together in Step S12. In the example illustrated here, the cyan, magenta, and yellow adjusting values Cv, Mv, Yv are each set to four values, giving 64 (=4×4×4) monochrome sample images $\Psi_{ijk}$ (where i, j, and k are each one integer 1, 2, 3 or 4). The plurality of monochrome sample images are divided into four sections of 16 each. In each section, yellow ink adjusting value Yv is equal; yellow ink adjusting value Y differs across different sections. The notation "Yv=level k" indicates the adjusting value for yellow ink (i.e. the maximum ejection amount); a larger k value indicates a greater yellow ejection amount, for example.

In each section, samples are arranged according to tint with greater cyan ink ejection amount as one moves rightward in the drawing; and according to tint with greater magenta ink ejection amount as one moves downward in the drawing. For monochrome sample images $\Psi_{ijk}$, greater values of symbols i, j, and k indicated greater ejection amounts of yellow, magenta, and cyan respectively.

By producing a catalog print containing images arranged as in FIG. 8, selection of the desired tone by the user can be facilitated.

Figure 9A:
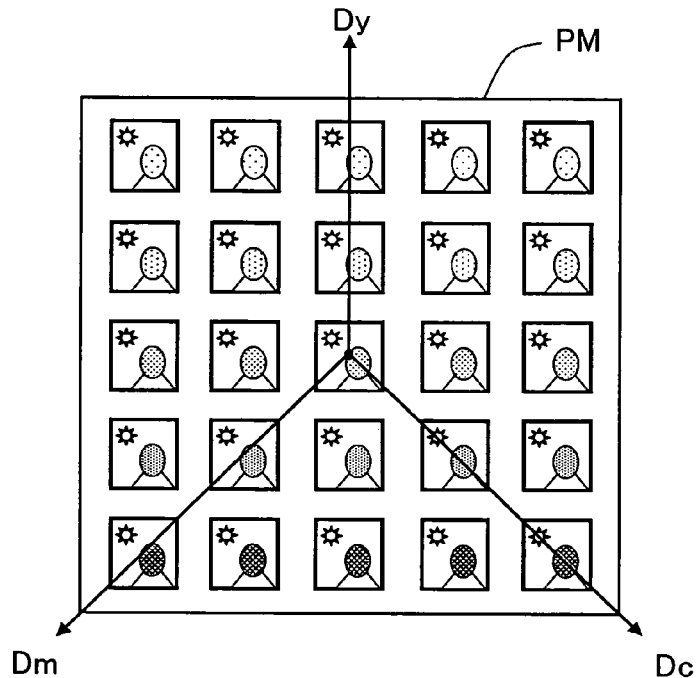
FIGS. 9(A) and 9(B) illustrate yet another arrangement of monochrome sample images in a catalog print.
Figure 9B:
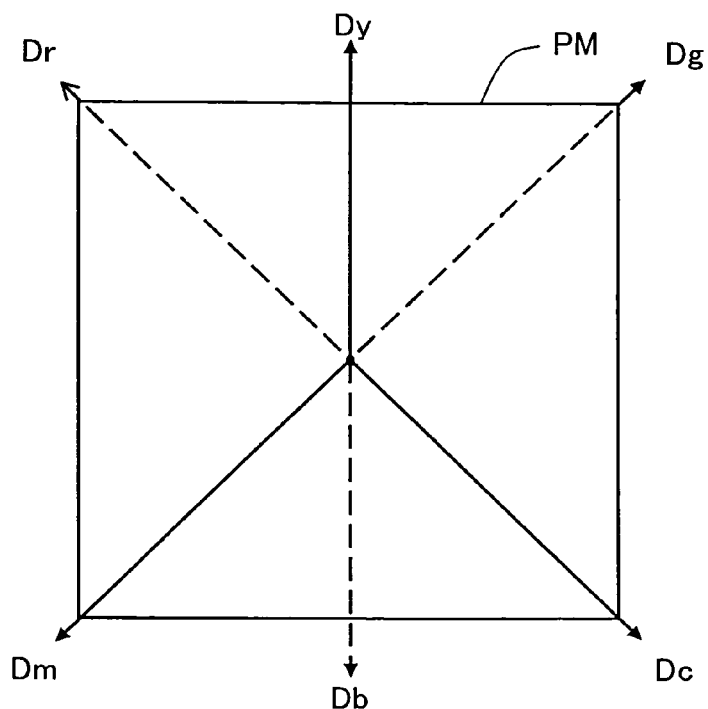

FIGS. 9(A) and 9(B) illustrate yet another arrangement of monochrome sample images in a catalog print. In the catalog print shown in FIG. 9(A), three hypothetical directions Dy, Dm, Dc are established on a printing medium PM. These directions Dy, Dm, Dc are axes indicating intensity of tint of the three chromatic primary colors yellow, cyan, and magenta. Specifically, saturation of hue of the colors increases moving outwardly in each direction. Directions Dy, Dm, Dc which indicate intensity of tint of the three chromatic primary colors may be actually drawn within the catalog print.

When initially printing a catalog print by the steps of FIG. 5 described previously, the sample image positioned in the center in FIG. 9(A) is neutral tone (achromatic). In the second catalog print, the sample image having the tone selected by the operator is positioned in the center. In either instance, yellow tint is more intense going upwardly in FIG. 9(A). Similarly, magenta tint is more intense going leftward down in FIG. 9(A), and magenta tint is more intense going rightward down in FIG. 9(A). As shown in FIG. 9(B), tint of the respective complementary colors is more intense in the directions Db, Dg, Dr opposite the three directions Dy, Dm, Dc.

In the catalog print of FIG. 9(A), intensity of tint of the three chromatic primary colors in the monochrome sample images can be confirmed visually from the locations of the sample images within the catalog print. By employing a two-dimensional arrangement for sample images in this way, the operator can accurately ascertain the tone of each sample image, which has the advantage of facilitating tone selection.

Figure 10:
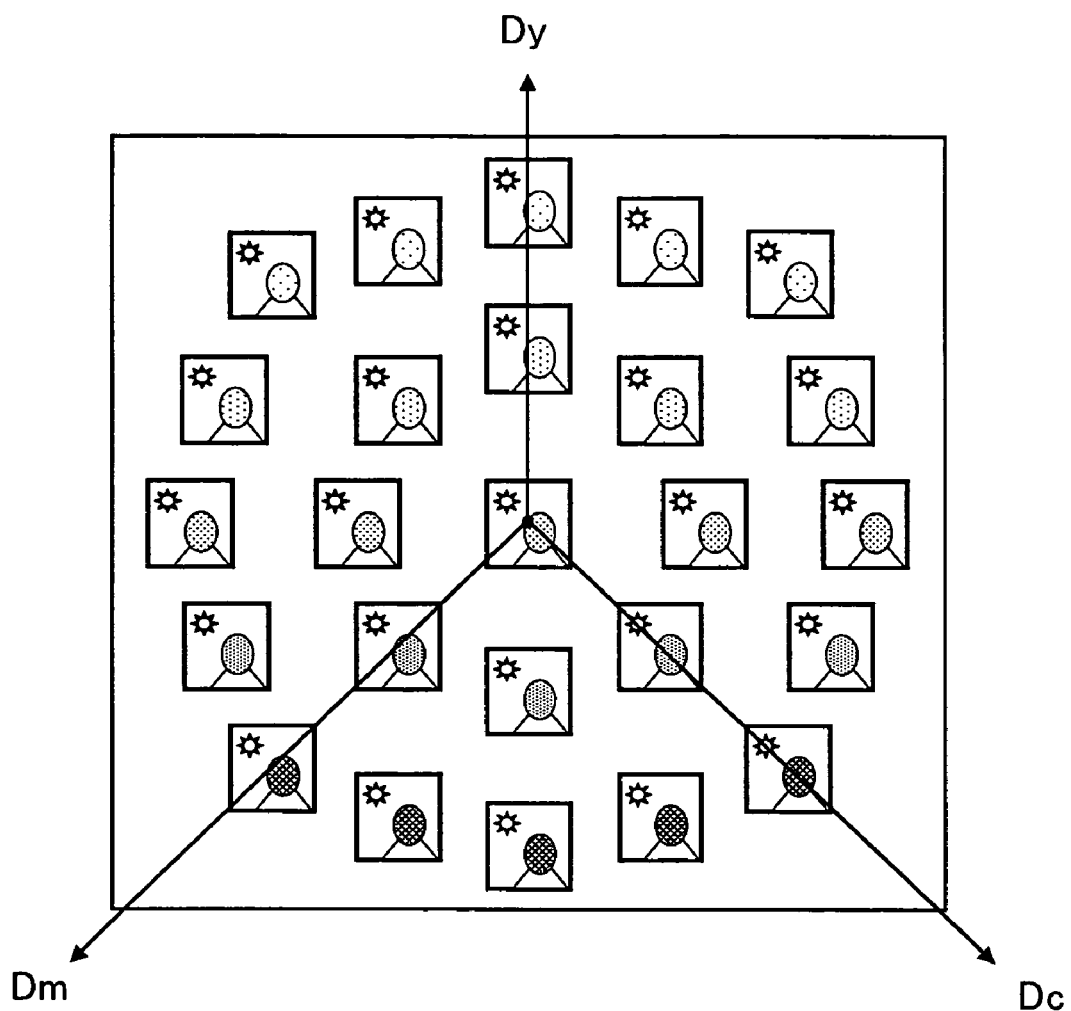
FIG. 10 illustrates yet another arrangement of monochrome sample images in a catalog print.

FIG. 10 illustrates an variant of the catalog print of FIG. 9(A). In this catalog print, sample images are arranged in concentric circles, with sample images arranged at locations that more faithfully reflect tint intensity. In this catalog print as well, intensity of tint of the three chromatic primary colors in monochrome sample images can be confirmed visually from the locations of the sample images within the catalog print. thereby facilitating tone selection by the operator.

B. Embodiment 2

Figure 11:
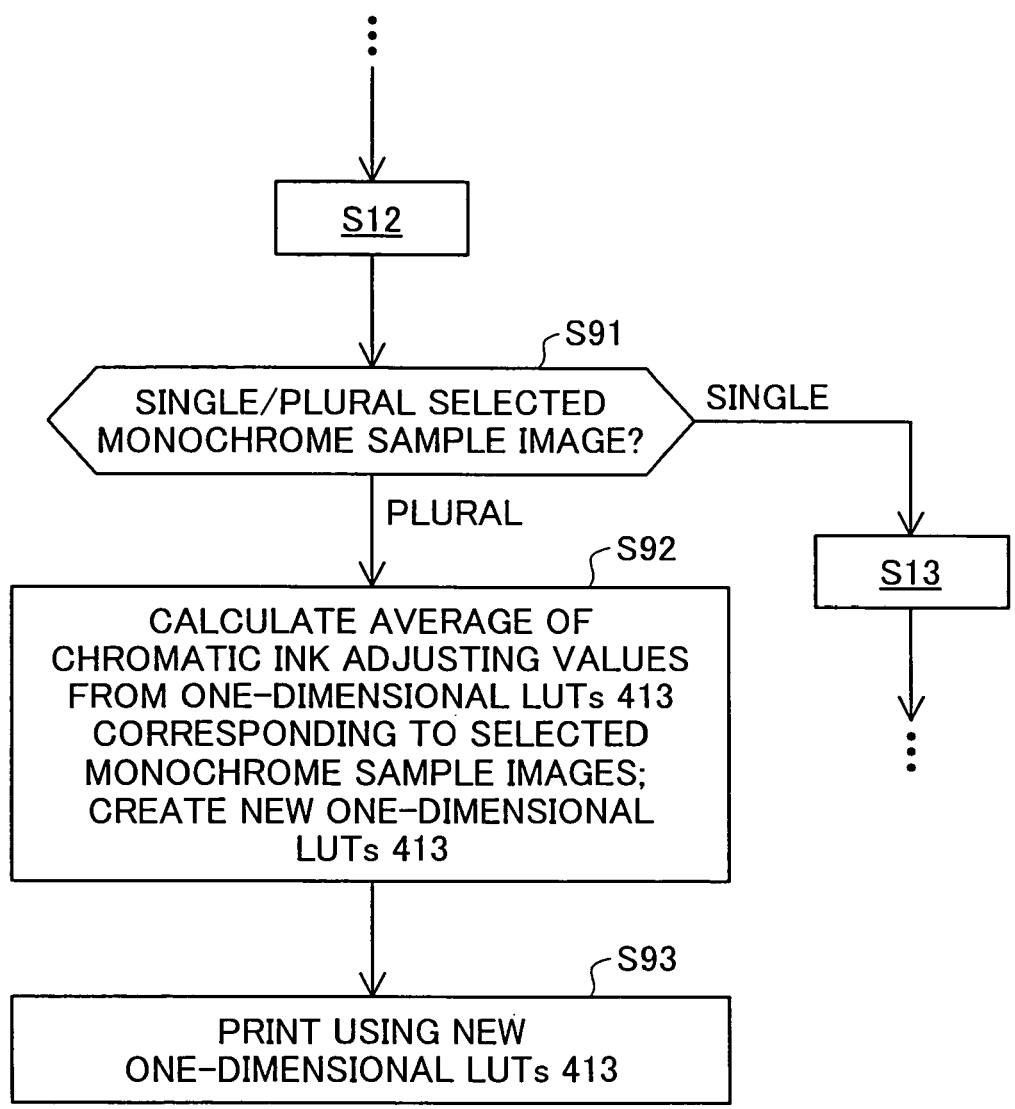
FIG. 11 is a flowchart showing operations in a second embodiment of the invention.

FIG. 11 is a flowchart showing a part of a characteristic color conversion process in a second embodiment. Additional steps S91, S92, S93 have been inserted between Step S12 and Step S13 in the flowchart shown in FIG. 5.

Once a plurality of monochrome sample images have been printed in Step S12, the operator selects the desired tone. At this time, in the event that a single monochrome sample image is selected and the selection input to computer 10, the process proceeds to Step S13 wherein the process described in Embodiment 1 resumes.

If, on the other hand, the desired tone is not found in the catalog print, the operator can select a plurality of monochrome sample images, and input the selections to computer 10. In this instance, the process proceeds to Step S91.

In Step S92, an average value for chromatic ink adjusting value Cv is calculated for the plurality of tone-setting one-dimensional LUTs 413 corresponding to the selected plurality of monochrome sample images. Using this average value for chromatic ink adjusting value, new tone-setting one-dimensional LUTs 413 are created. In this second embodiment, achromatic ink ejection amount is not dependent upon tone applied to a gray image to obtain a monochrome image, so it is not necessary to calculate an average value for achromatic ink; the achromatic ink ejection amount in either of the one-dimensional LUTs 412, 413 may be used as-is.

In Step S93, monochrome sample images are printed using the plurality of new tone-setting one-dimensional LUTs 413 created in Step S92.

In this way, in Embodiment 2, the operator can select at least two monochrome sample images, and additional monochrome sample images are printed using the average value of chromatic ink adjusting value for the plurality of selected monochrome sample images. Thus, even if the desired tone is not found in the catalog print, by selecting a plurality of monochrome sample images having similar tone, monochrome sample images having tone close to the desired tone can be printed.

C. Embodiment 3

Figure 12:
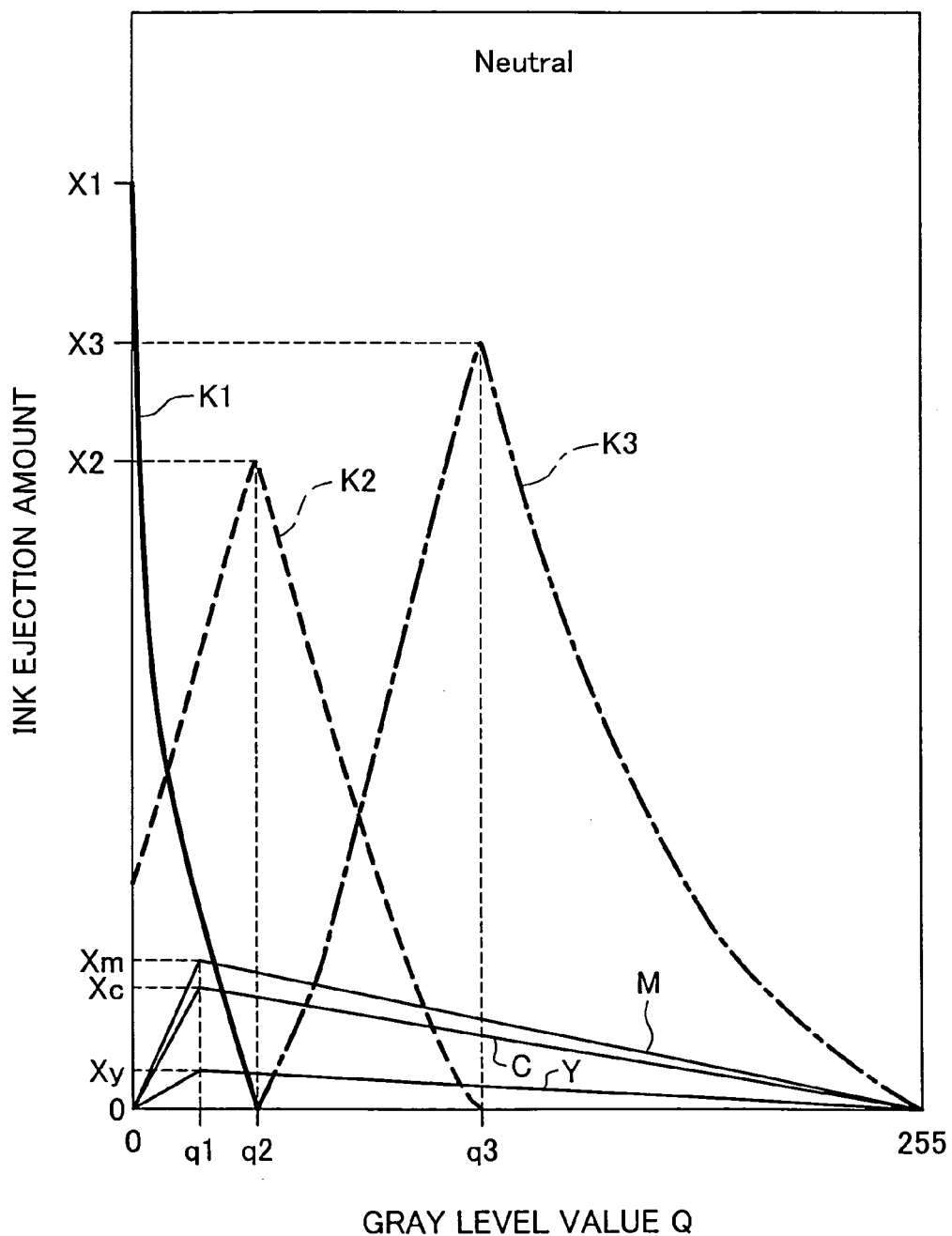
FIG. 12 is a graph showing ink ejection amount plotted against gray level value.

In Embodiment 3, a table for reproducing a monochrome image of specific tone that is not neutral tone is used as the standard one-dimensional LUT 412. FIG. 12 is a graph showing ejection amounts of inks for producing a gray image (i.e. a monochrome image of neutral tone), plotted against gray level value Q; it is more accurate than FIG. 4, which illustrates the same relationships.

When gray level value Q assumes a value of q1, the chromatic ink ejection amounts C, M, Y assume maximum values of Xm, Xc, Xy, respectively; and all assume a value of 0 when gray level value Q assumes the minimum value of 0 or the maximum value of 255. In this example of neutral tone, Xy<Xc<Xm.

Where gray level value Q assumes a value of 0, q2, or q3, ink ejection amounts K1, K2, K3 respectively their maximum values of X1, X2, and X3. As gray level value Q transitions from a value of 0 to a value of q2, ink ejection amount K1 decreases at a substantially constant rate from the maximum value of X1 to the minimum value of 0. Ink ejection amount K2 increases at a substantially constant rate as gray level value Q transitions from value of 0 to a value of q2. As gray level value Q transitions from a value of q2 to a value of q3, ink ejection amount K2 decreases at a substantially constant rate, becoming substantially 0 when gray level value Q assumes a value of q3. Ink ejection amount K3 increases at a substantially constant rate from the minimum value of 0 to the maximum value of X3 as gray level value Q transitions from a value of q2 to a value of q3, and increases at a substantially constant rate from the maximum value of X3 to the minimum value of 0 as gray level value Q transitions from a value of q3 to the maximum value of 255.

Figure 13:
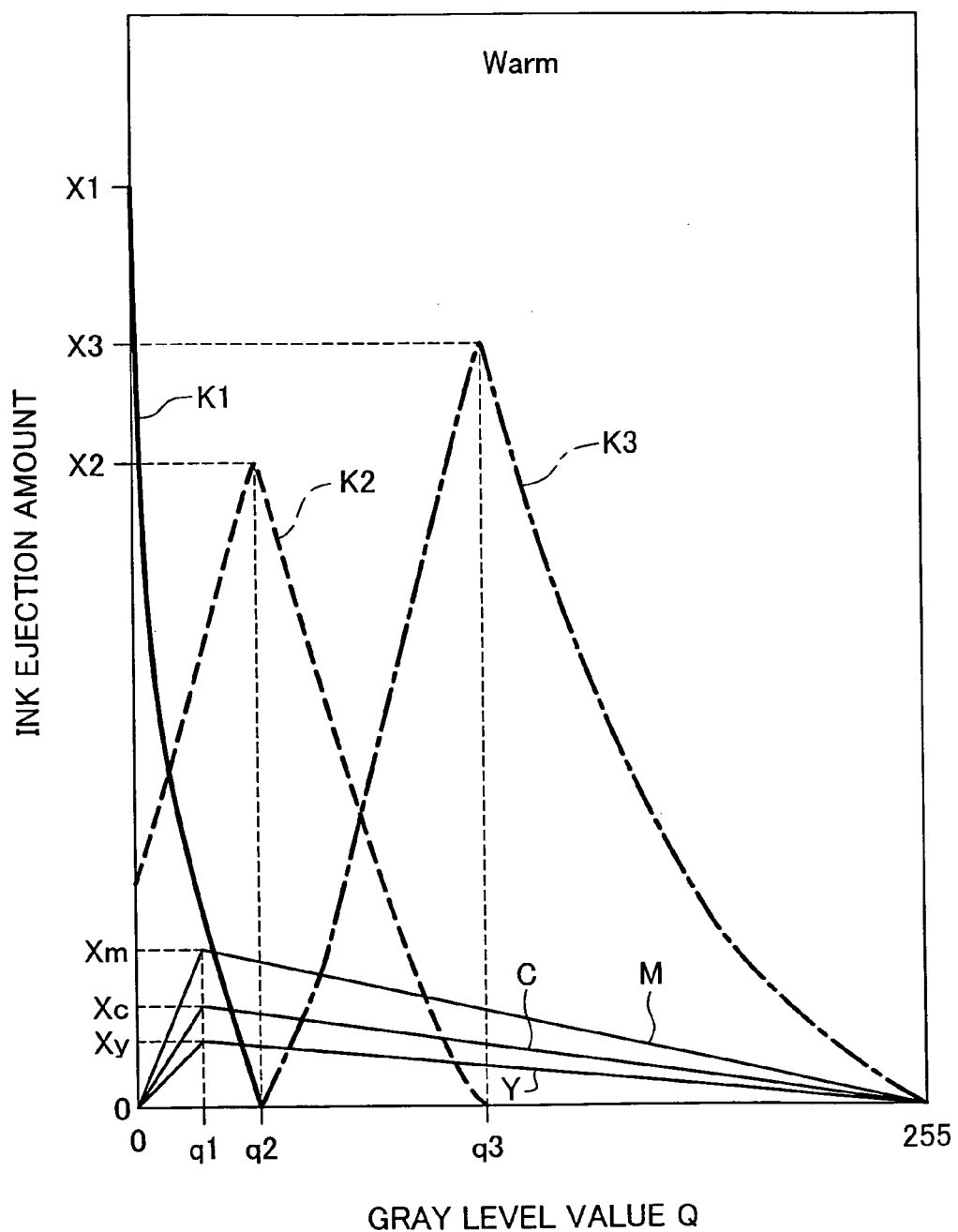
FIG. 13 is a graph showing ink ejection amount plotted against gray level value.

FIG. 13 is a graph showing ejection amounts for inks used to obtain a warm tone monochrome image, plotted against gray level value Q. Ink ejection amounts K1, K2, K3 are the same as with neutral tone. As with neutral tone, chromatic ink ejection amounts C, M, Y assume maximum values of Xm, Xc, Xy when gray level value Q assumes a value of q1, and all assume values of 0 when gray level value Q assumes the minimum value of 0 or the maximum value of 255. As with neutral tone, in this warm tone, Xy<Xc<Xm, but individual values of Xm, Xc, and Xy are different from neutral tone.

Figure 14:
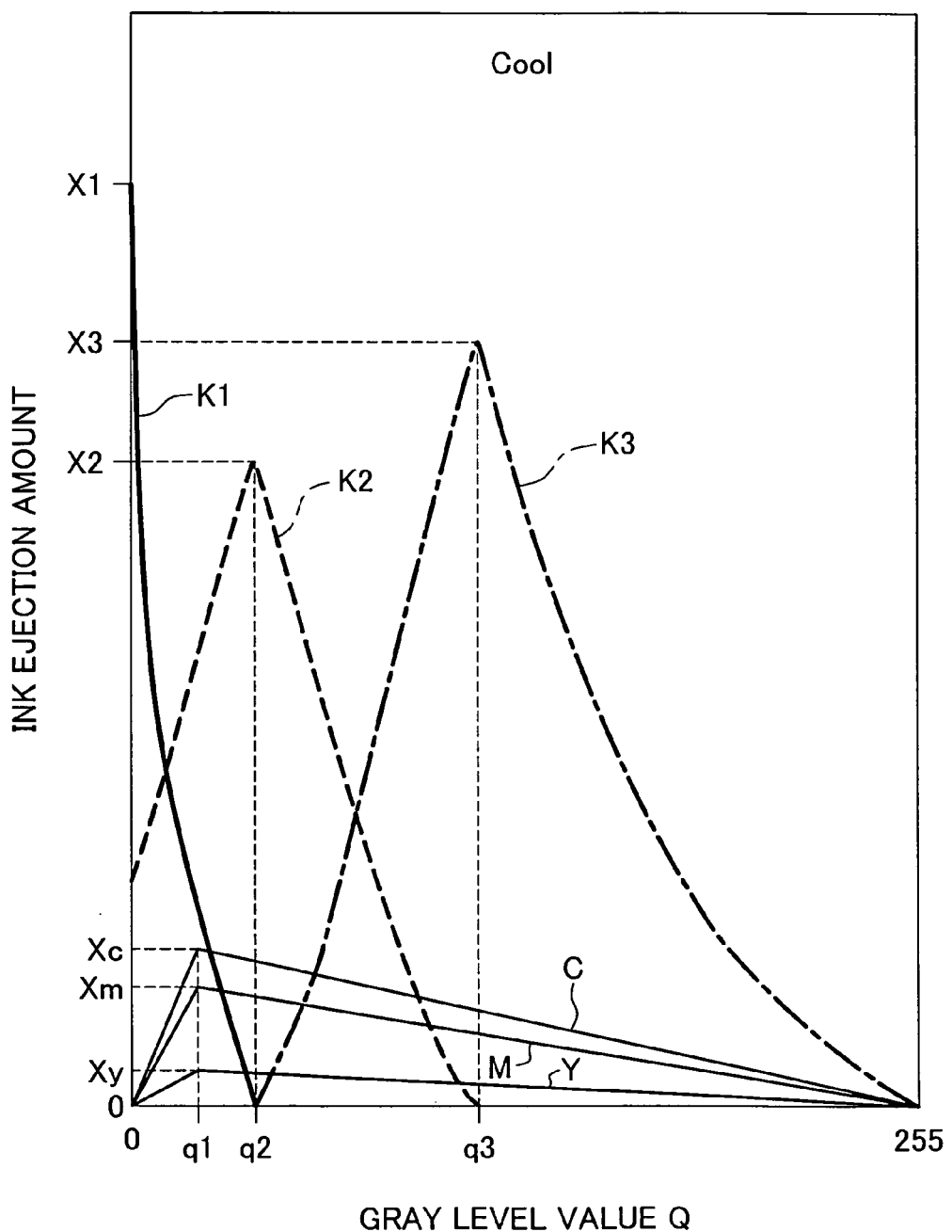
FIG. 14 is a graph showing ink ejection amount plotted against gray level value.

FIG. 14 is a graph showing ejection amounts for inks used to obtain a cool tone monochrome image, plotted against gray level value Q. Ink ejection amounts K1, K2, K3 are the same as with neutral tone. As with neutral tone, chromatic ink ejection amounts C, M, Y assume maximum values of Xm, Xc, Xy when gray level value Q assumes a value of q1, and all assume values of 0 when gray level value Q assumes the minimum value of 0 or the maximum value of 255. With cool tone, Xy<Xm<Xc.

Figure 15:
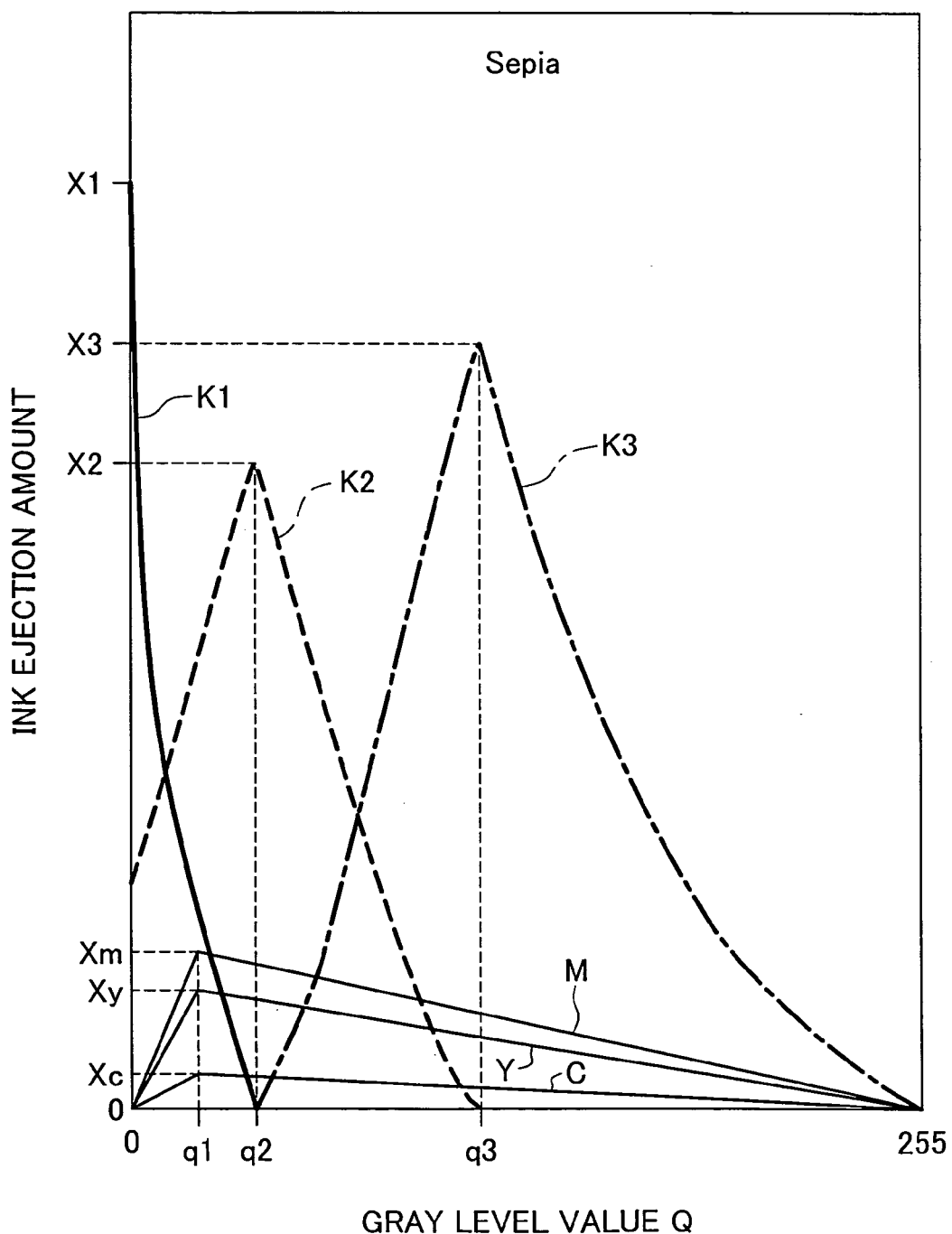
FIG. 15 is a graph showing ink ejection amount plotted against gray level value.

FIG. 15 is a graph showing ejection amounts for inks used to obtain a sepia tone monochrome image, plotted against gray level value Q. Ink ejection amounts K1, K2, K3 are the same as with neutral tone. As with neutral tone, chromatic ink ejection amounts C, M, Y assume maximum values of Xm, Xc, Xy when gray level value Q assumes a value of q1, and all assume values of 0 when gray level value Q assumes the minimum value of 0 or the maximum value of 255. With sepia tone, however, Xc<Xy<Xm.

Catalog prints may be produced also for monochrome sample images tinted with various tints using any of these well-known tones as the standard tone, rather than a gray image. Specifically, the standard one-dimensional LUT 412 could have stored therein, instead of ink ejection amounts for producing a neutral tone monochrome sample image (gray image), ink ejection amounts for producing another well-known tone such as warm, cool, or sepia tone.

Of course, there is no particular need for the standard tone to be well-known; any desired tone may be set as the standard tone. It is also possible to provide a plurality of standard one-dimensional LUTs 412, e.g., for warm tone, cool tone, and sepia tone, and to perform the processes of FIG. 5 using these.

However, an advantage of using a neutral tone as the standard tone is the small change in the amounts of chromatic ink need to change to a different tone.

D. Embodiment 4

Figure 16:
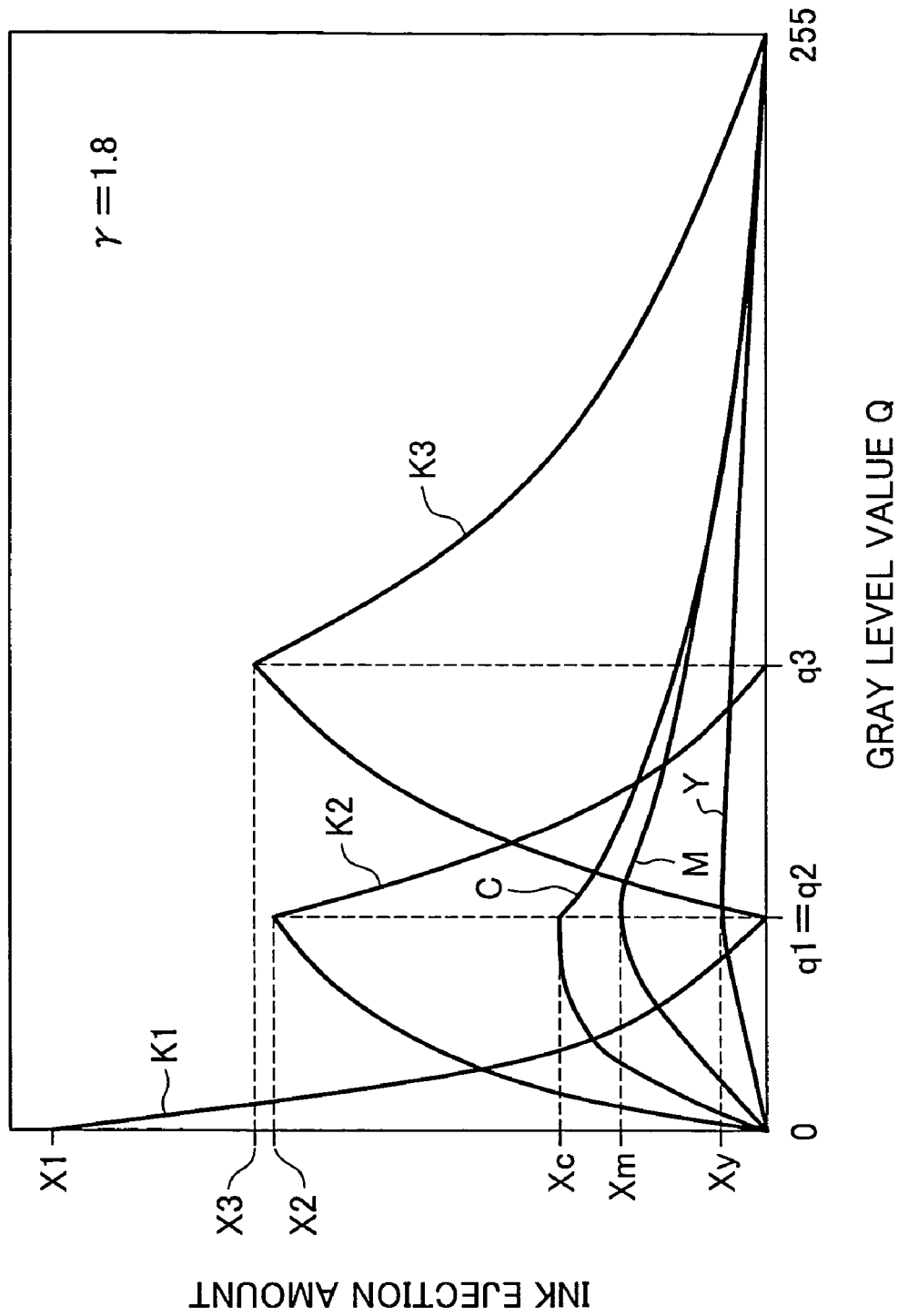
FIG. 16 is a graph showing ink ejection amount plotted against gray level value.
Figure 17:
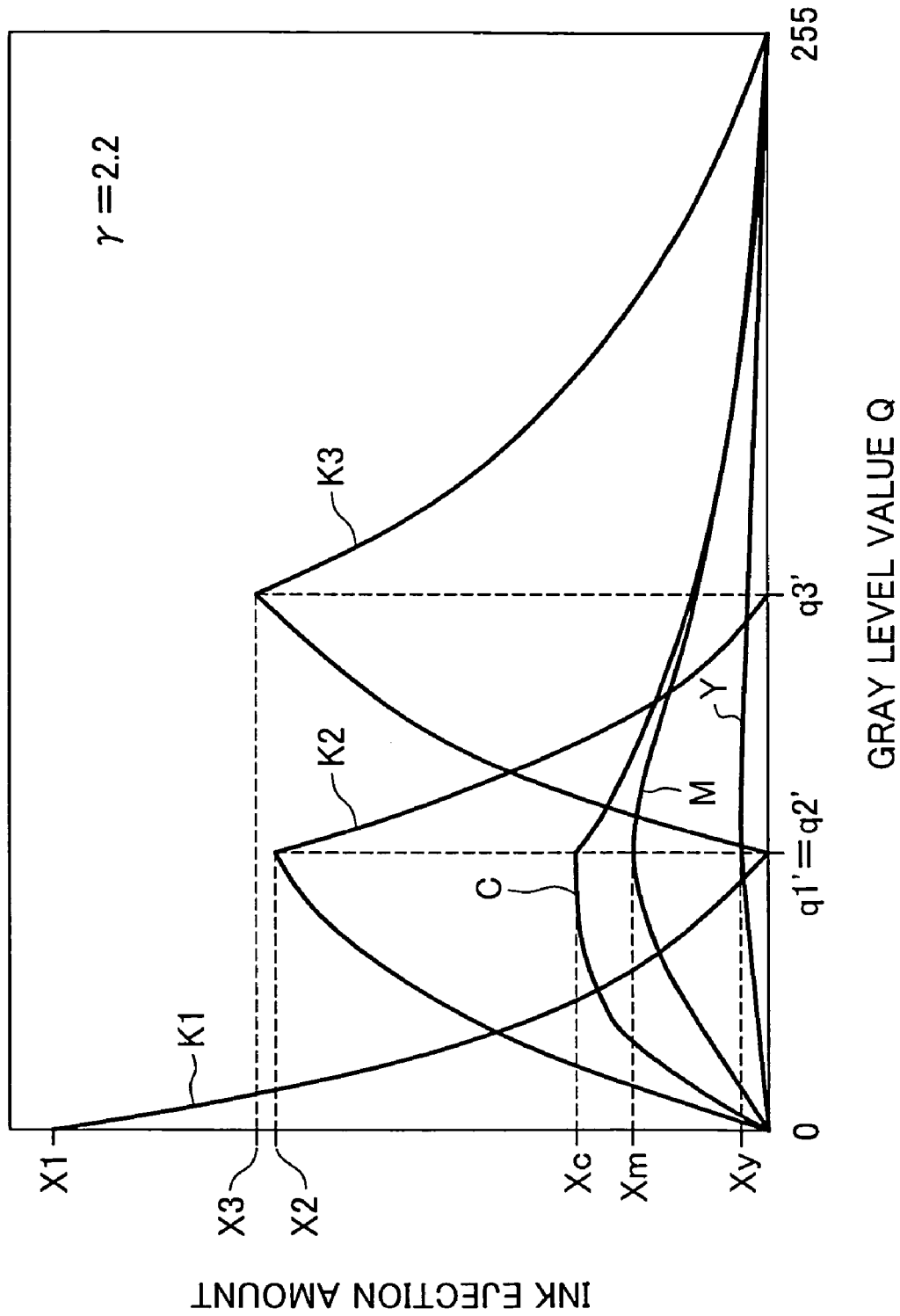
FIG. 17 is a graph showing ink ejection amount plotted against gray level value.

In Embodiment 4, various monochrome sample images are printed as a catalog print, using a different method than that described previously to vary the ejection amounts of chromatic ink. FIGS. 16 and 17 both show relationships between gray level value Q and ink ejection amount needed to produce a cool tone monochrome image; however, the γ value used for correction differs between the two. Specifically, FIG. 16 depicts as case where the γ value is 1.8, and FIG. 17 a case where the γ value is 2.2. The γ value is one type of tone correction, and input/output characteristics represented by the γ value are one type of gradation characteristics.

With γ correction, as ink ejection amounts an arbitrary gray level value Q, there are employed ink ejection amounts at a gray level value Q' that is associated in standard one-dimensional LUT 412 with a coefficient $(Q/Q_M)^\gamma$ determined by the γ value ($Q_M$ is the maximum value of gray level value Q: here, 255, for example). More specifically, as ink ejection amounts at gray level value Q in tone-setting one-dimensional LUTs 413, there are employed ink ejection amounts at a gray level value Q' $(=Q_M \times (Q/Q_M)^\gamma)$ in standard one-dimensional LUT 412. For example, where the γ value is 1.8, the gray level value Q' in standard one-dimensional LUT 412 corresponding to a gray level value Q of 128 in tone-setting one-dimensional LUTs 413 would be 74. At this time, ink ejection amounts for a gray level value Q of 128 in tone-setting one-dimensional LUTs 413 are obtained by referring to values for a gray level value Q' of 74 in standard one-dimensional LUT 412. Similarly, where the γ value is 2.2, the gray level value Q' in standard one-dimensional LUT 412 corresponding to a gray level value Q of 128 in tone-setting one-dimensional LUTs 413 would be 56. With γ correction in this manner, maximum value and minimum value of ink ejection amounts are unchanged with changes in γ value; only the value of gray level value Q at which ink ejection amount reaches its peak increases with an increase in γ value. As a result, the lightness distribution of the corresponding monochrome image varies. This lightness distribution is a factor that affects tone in a monochrome image.

In the example given in Embodiment 4, the value of gray level value Q at which chromatic ink reaches its peak coincides with the value of gray level value Q at which the achromatic ink ejection amount K2 of reaches its peak. In FIG. 16, these gray level values Q assume the values q1=q2, and in FIG. 17 the values q1'=q2', with q1<q1'. The same is true of the gray level value Q at which the achromatic ink ejection amount K3 of reaches its peak, this value being larger when γ value is 2.2 (q3') than when γ value is 1.8 (value q3).

By determining standard tone in this way, it is possible to arrive at ink ejection amounts for reproducing monochrome images of various lightness distributions, by means of a plurality of γ values.

Figure 18:
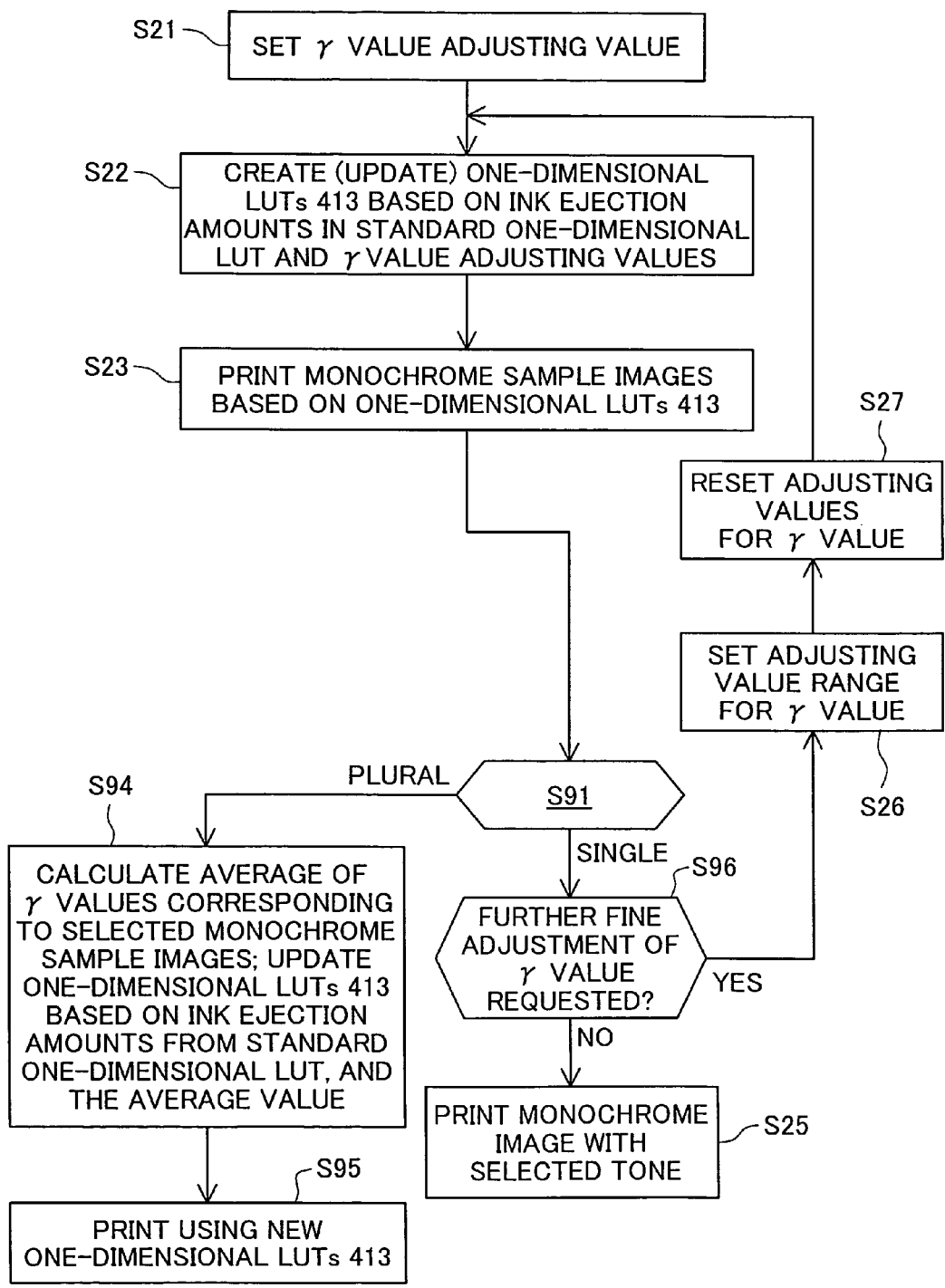
FIG. 18 is a flowchart showing operations in a fourth embodiment of the invention.

FIG. 18 is a flowchart showing the characteristic color conversion process of color conversion module 41b in Embodiment 4. First, in Step S21, γ value adjusting values (variation quantity) are set. Here, "γ value adjusting values" refers to a plurality of γ values set at a predetermined interval Δγ. For example, where the adjusting value range is set to 1.8-2.2 and interval Δγ to 0.1, the γ value adjusting values will be 1.8, 1.9, 2.0, 2.1, and 2.2.

Proceeding next to Step S22, ink ejection amounts for a standard tone monochrome image are read from standard one-dimensional LUT 412. Next, new ink ejection amounts are calculated on the basis of these and γ value adjusting values, creating a tone-setting one-dimensional LUT 413 for each γ value. In contrast to the flowchart shown in FIG. 5, achromatic ink ejection amount is affected by γ value, so calculations based on γ value are needed for achromatic ink as well. The plurality of tone-setting one-dimensional LUTs 413 created in this way have mutually different color reproduction characteristics.

Proceeding next to Step S23, on the basis of the one-dimensional LUTs 413 created in Step S22, a plurality of monochrome sample images are printed to produce a catalog print. More specifically, image data DT1 of catalog images compiling monochrome sample images of different γ values is generated, and a plurality of monochrome sample images are printed by printer 30 on the basis of this image data DT1.

In this way, in Step S23, image data compiling a plurality of monochrome sample images having different γ values based on a given gray image is generated, and catalog images printed on the basis thereof. By so doing it is possible to assist the operator in setting the desired γ value.

The operator selects the desired sample image from the catalog print and inputs the selection to computer 10. The process then proceeds to Step S91 wherein it is determined whether a single or a plurality of monochrome sample images have been selected as shown in FIG. 11. In event that a plurality of images were selected, the process proceeds to Step S94.

In Step S94, a one-dimensional LUT having a new lightness distribution is created from the selected plurality of monochrome sample images. Specifically, a plurality of γ values corresponding to the selected monochrome sample images are obtained, and on the basis of ink ejection amounts in the standard one-dimensional LUT 412 and the average value of the γ values, the one-dimensional LUT 413 is updated. It is not preferable to employ an average value of chromatic ink ejection amounts as with the case in Step S92 in Embodiment 2 shown in FIG. 11. The reason is that ink ejection amount peak relative to gray level value Q depends on γ value.

Proceeding next to Step S95, a final monochrome image is printed using the one-dimensional LUT 413 obtained in Step S94.

In Step S91, if only a single monochrome sample image has been selected, the process proceeds from Step 91 to Step S24. Step S24 is the same process as Step S14 in FIG. 5, and involves determining whether further fine adjustment of tone is requested. If fine adjustment is not requested, the process moves to Step S25 wherein, in the same manner as in Step S15 in FIG. 5, a monochrome image is printed with the selected tone.

If adjustment is requested, the process moves to Step S26 wherein the γ adjusting value range is set. This adjusting value range is narrower than the adjusting value range set previously, being set, for example, equal to the interval Δγ set previously. Advancing to Step S27, γ value adjusting values are reset. Specifically, interval Δγ is reset within the adjusting value range set in Step S26, to set a plurality of γ values. For example, where a monochrome sample image corresponding to γ=1.9 has been selected from the catalog print printed in Step S23, and fine adjustment has been requested, the adjusting value range will be 1.85-1.95 and the interval Δγ 0.02. Thus, the γ value adjusting values reset in Step S27 will be 1.85, 1.87, 1.89, a.91, 1.93, and 1.95.

After executing Step S27, the process returns to Step S22, and the one-dimensional lookup tables 413 are updated using the newly set γ value adjusting values.

By means of printing in the above manner, it is a simple matter to view together monochrome images having the same hue but different lightness distributions, thereby assisting the process of setting the desired lightness distribution.

Even with a change in γ value, ink ejection amount with respect to change in gray level value Q merely changes, with no change in ink ejection amount per se. Thus, limits as to ink ejection amount for printing media are unrelated to γ value. Thus, even if γ value should change, catalog printing can be carried out under limits of ink ejection amount for printing media.

E. Embodiment 5

Figure 19:
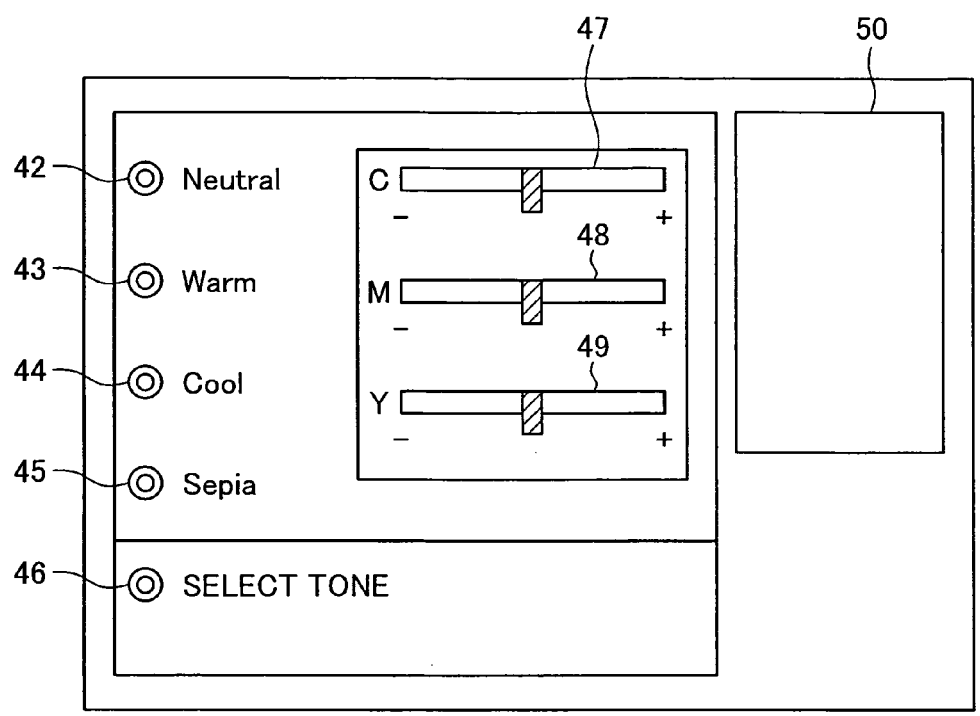
FIG. 19 illustrates a user interface screen in a fifth embodiment of the invention.

In Embodiment 5, selection of the desired tone is performed on CRT 22, without performing catalog printing. FIG. 19 is an illustration of a user interface screen for setting a tone, displayed on CRT 22 by means of operation of color conversion module 41b. This screen is displayed on CRT 22 by means of CRT driver software 17 being operated from color conversion module 41b.

This user interface screen displays buttons 42-46, control bars 47-49, and a monochrome image display area 50. Buttons 42-46 and control bars 47-49 constitute control areas that are controllable on the screen. Here, control area refers to an area whose corresponding process can be performed by placing a pointer (not shown) displayed on the screen over or near the location where the area is displayed, or by additionally turning on an input switch (not shown).

Buttons 42, 43, 44, and 45 are control areas for obtaining monochrome images of tone varied on the basis of neutral tone, warm tone, cool tone, and sepia tone, respectively. Button 46 is a control area for selecting tone. Control bars 47-49 are control areas for increasing or decreasing ejection amounts of cyan, magenta, and yellow inks respectively. Monochrome image display area 50 reproduces, on CRT 22, the monochrome image that would be obtained by printing based on the tone determined by buttons 42, 43, 44, and 45, with ink ejection amounts adjusted by means of control bars 47-49.

Figure 20:
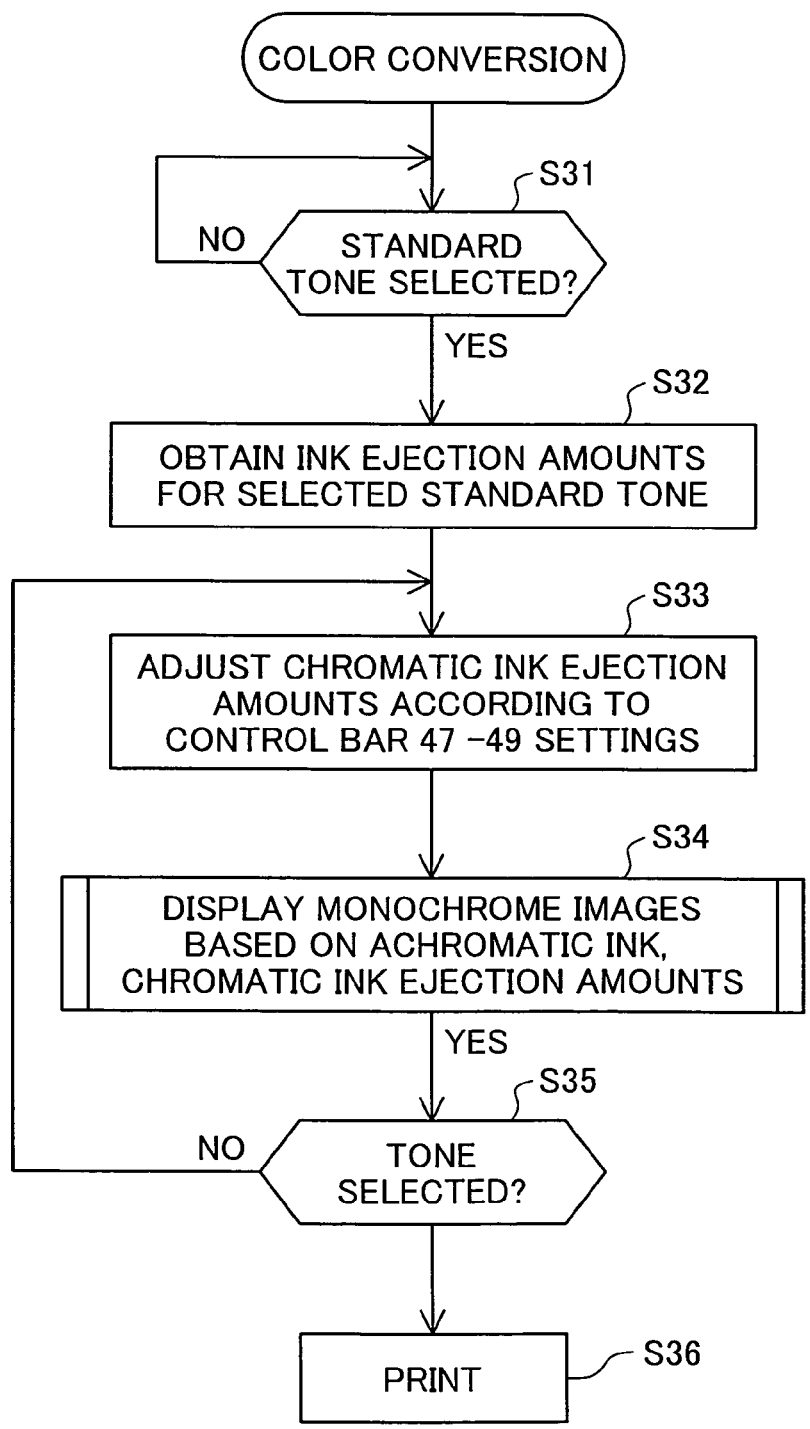
FIG. 20 is a flowchart showing operations in a fifth embodiment of the invention.

FIG. 20 is a flowchart showing printing of a monochrome image in Embodiment 5. In Step S31, it is determined whether a standard tone has been selected, suspending advancement to Step S32 until selection has been made. Once the operator has selected button 42, 43, 44, or 45, the process advances to Step S32.

In Embodiment 5, four types of standard one-dimensional LUT 412, namely neutral tone, warm tone, cool tone, and sepia tone, have been prepared in advance. In these standard one-dimensional LUTs 412 are stored ink ejection amounts associated with gray level value Q in the manner shown by way of example in FIGS. 12 to 15.

In Step S32, ink ejection amounts corresponding to the selected standard tone are determined. Specifically, ink ejection amounts are read out from the one-dimensional LUT 412 corresponding to the selected standard tone.

Advancing next to Step S33, on the basis of the control settings of control bars 47-49, ejection amounts of the chromatic inks (here, cyan, magenta, and yellow) are increased or decreased with reference to the tone used as the standard. The resultant chromatic ink ejection amounts and achromatic ink ejection amounts are stored in a new one-dimensional LUT 413.

Proceeding to Step S34, on the basis of the ink ejection amounts of the one-dimensional LUT 413 created in Step S33, a monochrome image is displayed in monochrome image display area 50. The RGB signal used for display on CRT 22 is determined on the basis of ink ejection amounts; this technique is described in detail later. The process then proceeds to Step S35.

The operator visually inspects the monochrome image shown in monochrome image display area 50 and decides whether the tone is the desired one. If it is the desired tone, the operator uses button 46 to select the tone corresponding to the monochrome image being shown in monochrome image display area 50. In Step S35, it is determined whether a tone has been selected, and if a tone has been selected, i.e., if button 46 has been operated, the process now proceeds to Step S36, wherein a monochrome image is printed on the basis of the selected tone, i.e., the ink amounts in the current one-dimensional LUT 413.

If a tone has not been selected, i.e., if button 46 has not been operated, the process returns from Step S35 to Step S33. Since the process advances in this manner, the operator can experimentally increase or decrease chromatic ink relative to a standard tone while viewing the monochrome images shown in monochrome image display area 50, until the desired tone is obtained.

Display of a monochrome image reflecting increase/decrease of chromatic ink on CRT 22 in this way is accomplished by means of conversion to an RGB signal based on one-dimensional LUT 413. As compared to the case of a catalog print of a plurality of monochrome images as described hereinabove in Embodiment 1 and Embodiment 2, there is a greater number of standard one-dimensional LUTs 412 for storing standards tones for obtaining desired tone; however, as a single one-dimensional LUT 413 suffices for obtaining desired tone, the number is markedly smaller. This is preferable in terms of reducing required memory capacity.

In place of, or in addition to, control bars 47-49, there could be provided a control bar for performing γ correction, so that γ correction can be performed.

On the tone conversion user interface screen, an additional separate control area for customizing images could be provided, and by operation thereof, settings made so as to perform the operations described in Embodiment 1 and Embodiment 2.

F. Embodiment 6

Embodiment 6 describes a technique for displaying a monochrome image of predetermined tone on CRT 22, on the basis of a one-dimensional LUT for reproducing a monochrome image of this tone. Specifically, it describes a technique for calculating an RGB signal from ink ejection amounts, in order to display on CRT 22 a predetermined tone to be realized during printing. Following is a detailed description of Step S34 in FIG. 20 of Embodiment 5. This technique is also applicable when inputting to computer 10 a hue selected from a catalog print, as described in Embodiment 1.

Figure 21:
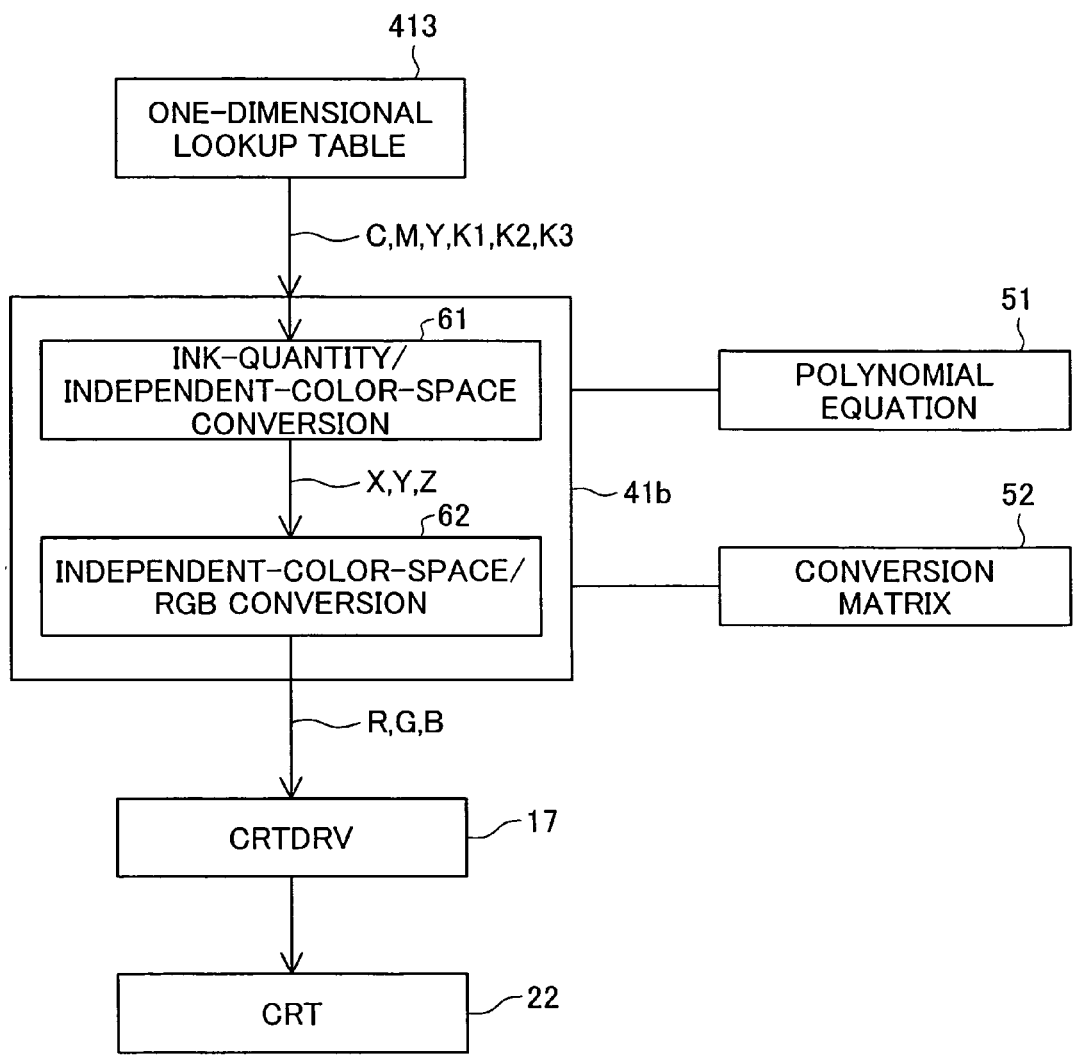
FIG. 21 is a block diagram showing operations in a sixth embodiment of the invention.

FIG. 21 is a block diagram illustrating signal processing in Embodiment 6. In color conversion module 41b, two conversion functions (for convenience, represented by blocks) are executed. One of these is an ink quantity-independent color space conversion function 61 for conversion from ink ejection amount to a device-independent color space, and the other is an independent color space-RGB conversion function 62 for converting from a device-independent color space to an RGB signal.

From a one-dimensional LUT 413 created or updated in Steps S11, S12 or S33, ink ejection amounts C, M, Y, K1, K2, K3 are provided to color conversion module 41b.

In the meantime, a polynomial conversion equation 51 stored in printer driver 41 associates ink ejection amounts employed by the printer with a device-independent color space. On the basis of the polynomial conversion equation 51 and ink ejection amounts C, M, Y, K1, K2, K3, the ink-quantity/independent-color-space conversion function 61 computes coordinates in a device-independent color space, for example, an X, Y, Z space. FIG. 21 also uses X, Y, Z as symbols denoting their coordinates.

A conversion matrix 52, stored in printer driver 41, associates the RGB used by the monitor with the device-independent color space. On the basis of the conversion matrix 52 and coordinates in the X, Y, Z space, the independent-color-space/RGB conversion function 62 determines an RGB signal suitable for the monitor, i.e. CRT 22.

The RGB signal determined in this manner is presented by color conversion module 41b to CRT 22 via CRT driver software 17. Accordingly, an image corresponding to ink ejection amounts set in Step S11, S22 or S33 can be displayed on CRT 22.

As will be apparent from the embodiments set forth hereinabove, catalog images composed of a plurality of arranged monochrome sample images can be reproduced as a printout, or reproduced on a monitor screen.

As described previously, printer driver 41 runs on a predetermined operating system installed on computer 10. Accordingly, computer 10, by running printer driver 41 and application program 40 at least in part, functions as a tone setting assisting device. In other words, printer driver 41 and application program 40, at least in part, correspond to a program that causes computer 10 to create image data compiling a plurality of monochrome sample images having a plurality of different tones applied to a gray image, or image data compiling a plurality of monochrome sample images imparted with predetermined tint and having a plurality of different gradation characteristics. Also, computer that reads the program from a storage medium can function as a tone setting assisting device.

G. Variant Examples

The invention is not limited to the working examples and embodiments set forth hereinabove, various improvements and modifications being possible without departing from the scope thereof, such as the following variant examples.

G1. Variant Example 1

In the embodiments hereinabove, chromatic ink ejection amounts Cv, Mv, Yv and γ value are used as adjusting values for setting a tone, but various other kinds of values could be used as adjusting values (or setting values) for setting a tone. For example, values of the ratios (Cv/Cmax), (Mv/Mmax), (Yv/Ymax) used in Embodiment 1, or the ratio of the standard γ value ($\gamma_0$) to the γ value adjusting value ($\gamma/\gamma_0$) could be used as adjusting values.

In the embodiments hereinabove, the interval among the plurality of adjusting values is constant, but the plurality of adjusting values could instead be set at arbitrary intervals that are not constant. However, a constant adjusting value interval has the advantage of reproducing sample images at substantially equal tone intervals.

G2. Variant Example 2

In the embodiments hereinabove, three types of ink, namely, C, M, and Y, are used as chromatic inks, but other chromatic inks could be used as well. The invention is also applicable to instances in which a single type of chromatic ink can be used to print monochrome images. However, where two or more kinds of chromatic ink can be used, this is preferred owing to the greater degree of freedom in setting a tone, with the ability to use three or more kinds of chromatic ink being especially preferred. Also, in preferred practice, at least one kind of ink will be useable as achromatic ink.

While the invention has been shown and described in detail hereinabove through certain preferred embodiments, the spirit and scope are not limited thereto, being limited only by the appended claims.

What is claimed is:

1. A tone setting assisting method comprising the steps of:
    (a) obtaining a gray image; and
    (b) printing together a plurality of monochrome images obtained by imparting a plurality of different tints to the gray image, wherein the step (b) includes calculating an ejection amount of at least one chromatic ink for each of the plurality of tints, based on lightness level values of the gray image,
    wherein method further includes the step of calculating, with respect to each of the monochrome images, achromatic ink ejection amounts associated with the gray image based on a table that associates lightness level value with ejection amount of at least one achromatic ink having predetermined lightness, the table further associating the lightness level values with ejection amounts of the chromatic inks, the ejection amounts of the chromatic inks being calculated for each of the plurality of tints, by means of multiplying, by predetermined coefficients, the ejection amounts of the chromatic inks associated with the lightness level values in the table, the predetermined coefficients being obtained by dividing maximum values of ejection amounts of the chromatic inks corresponding to the plurality of tints, by maximum values of ejection amounts of the chromatic inks associated with the lightness level values in the table, the maximum values of ejection amounts of the chromatic inks corresponding to the plurality of tints being set to a plurality of values at a predetermined interval within a predetermined range, and
    wherein the step (b) is executed repeatedly, with the predetermined range and the predetermined interval in iteration N (where N is an integer equal to 2 or greater) of the step (b) being respectively smaller than the predetermined range and the predetermined interval in iteration N−1 of the step (b).

2. A tone setting assisting method according to claim 1 wherein the ejection amounts of the chromatic inks are limited by a total ejection amount of the achromatic inks.

3. A tone setting assisting apparatus for generating image data that compiles a plurality of monochrome images which are obtained by imparting a plurality of different tints to a gray image, the apparatus comprising logic for:
    (a) obtaining a gray image; and
    (b) printing together a plurality of monochrome images obtained by imparting a plurality of different tints to the gray image, wherein the step (b) includes calculating an ejection amount of at least one chromatic ink for each of the plurality of tints, based on lightness level values of the gray image,
    wherein the apparatus further includes logic for calculating, with respect to each of the monochrome images, achromatic ink ejection amounts associated with the gray image based on a table that associates lightness level value with ejection amount of at least one achromatic ink having predetermined lightness, the table further associating the lightness level values with ejection amounts of the chromatic inks, the ejection amounts of the chromatic inks being calculated for each of the plurality of tints, by means of multiplying, by predetermined coefficients, the ejection amounts of the chromatic inks associated with the lightness level values in the table, the predetermined coefficients being obtained by dividing maximum values of ejection amounts of the chromatic inks corresponding to the plurality of tints, by maximum values of ejection amounts of the chromatic inks associated with the lightness level values in the table, the maximum values of ejection amounts of the chromatic inks corresponding to the plurality of tints being set to a plurality of values at a predetermined interval within a predetermined range,
    wherein the step (b) is executed repeatedly, with the predetermined range and the predetermined interval in iteration N (where N is an integer equal to 2 or greater) of the step (b) being respectively smaller than the predetermined range and the predetermined interval in iteration N−1 of the step (b), and
    wherein each of step (a), step (b), and the step of calculating the achromatic ink ejection amounts associated with the gray image is executed by an integrated circuit.

4. A computer program product for setting a tone in order to print a monochrome image, comprising:
    a computer-readable medium; and
    a computer program stored on the computer-readable medium, the computer program causing a computer to execute the steps of:
    (a) obtaining a gray image; and
    (b) printing together a plurality of monochrome images obtained by imparting a plurality of different tints to the gray image, wherein the step (b) includes calculating an ejection amount of at least one chromatic ink for each of the plurality of tints, based on lightness level values of the gray image,
    wherein computer program further causes the computer to execute the step of calculating, with respect to each of the monochrome images, achromatic ink ejection amounts associated with the gray image based on a table that associates lightness level value with ejection amount of at least one achromatic ink having predetermined lightness, the table further associating the lightness level values with ejection amounts of the chromatic inks, the ejection amounts of the chromatic inks being calculated for each of the plurality of tints, by means of multiplying, by predetermined coefficients, the ejection amounts of the chromatic inks associated with the lightness level values in the table, the predetermined coefficients being obtained by dividing maximum values of ejection amounts of the chromatic inks corresponding to the plurality of tints, by maximum values of ejection amounts of the chromatic inks associated with the lightness level values in the table, the maximum values of ejection amounts of the chromatic inks corresponding to the plurality of tints being set to a plurality of values at a predetermined interval within a predetermined range, and wherein the step (b) is executed repeatedly, with the predetermined range and the predetermined interval in iteration N (where N is an integer equal to 2 or greater) of the step (b) being respectively smaller than the predetermined range and the predetermined interval in iteration N−1 of the step (b).

\* \* \* \* \*